(12) United States Patent
Brumby et al.

(10) Patent No.: US 12,555,357 B2
(45) Date of Patent: Feb. 17, 2026

(54) SYSTEMS AND METHODS FOR CATEGORIZING IMAGE PIXELS

(71) Applicant: Impact Observatory, Inc., Washington, DC (US)

(72) Inventors: Steven P. Brumby, Washington, DC (US); Caitlin Kontgis, Santa Fe, NM (US); Krishna Karra, Santa Fe, NM (US)

(73) Assignee: Impact Observatory, Inc., Washington, DC (US)

( * ) Notice: Subject to any disclaimer, the term of this patent is extended or adjusted under 35 U.S.C. 154(b) by 616 days.

(21) Appl. No.: 17/847,512

(22) Filed: Jun. 23, 2022

(65) Prior Publication Data

US 2022/0415022 A1    Dec. 29, 2022

Related U.S. Application Data

(60) Provisional application No. 63/214,174, filed on Jun. 23, 2021.

(51) Int. Cl.
  *G06V 20/10*    (2022.01)
  *G06T 11/00*    (2006.01)
  (Continued)

(52) U.S. Cl.
  CPC ............ *G06V 10/774* (2022.01); *G06T 11/00* (2013.01); *G06V 10/22* (2022.01); *G06V 10/44* (2022.01);
  (Continued)

(58) Field of Classification Search
  CPC .... G06V 20/188; G06V 10/82; G06V 20/194; G06F 18/2178
  See application file for complete search history.

(56) References Cited

U.S. PATENT DOCUMENTS 9,477,901 B2    10/2016  Paiton et al.
12,340,516 B2 *  6/2025  Mohite .................. G06Q 50/18
(Continued)

FOREIGN PATENT DOCUMENTS

WO    2008/156634 A1    12/2008
WO    2022/271942 A1    12/2022

OTHER PUBLICATIONS

P. Griffiths, S. van der Linden, T. Kuemmerle and P. Hostert, "A Pixel-Based Landsat Compositing Algorithm for Large Area Land Cover Mapping," in IEEE Journal, vol. 6, No. 5, pp. 2088-2101, Oct. 2013, doi: 10.1109/JSTARS.2012.2228167. (Year: 2013).*
(Continued)

*Primary Examiner* — Stephen R Koziol
*Assistant Examiner* — Ashley Hytrek
(74) *Attorney, Agent, or Firm* — HG LAW LLP

(57) ABSTRACT

Systems and methods are described to systems and methods for training a machine learning model to categorize each pixel of an input overhead image using received overhead images, and using a trained machine learning model to determine, for each pixel of input overhead images, to which land use or land cover mapping category each pixel of each overhead image belongs. The provided systems and methods may generate a map of a geographic area associated with the plurality of overhead images based on the plurality of overhead images and on the determined categories.

72 Claims, 23 Drawing Sheets

(51) Int. Cl.
  *G06V 10/22* (2022.01)
  *G06V 10/44* (2022.01)
  *G06V 10/764* (2022.01)
  *G06V 10/774* (2022.01)
  *G06V 10/778* (2022.01)
  *G06V 20/13* (2022.01)
(52) U.S. Cl.
  CPC ........ *G06V 10/764* (2022.01); *G06V 10/7784* (2022.01); *G06V 20/13* (2022.01); *G06V 20/188* (2022.01)

(56) References Cited

U.S. PATENT DOCUMENTS

| | | | | |
|---|---|---|---|---|
| 2004/0189686 A1* | 9/2004 | Tanguay, Jr. | ........ | G06F 15/7867 345/420 |
| 2021/0150717 A1* | 5/2021 | Guo | ..................... | G06N 3/0464 |

OTHER PUBLICATIONS

Kussul, N., Skakun, S., Shelestov, A., Lavreniuk, M., Yailymov, B., & Kussul, O. (2015). Regional scale crop mapping using multi-temporal satellite imagery. The International Archives of the Photogrammetry, Remote Sensing and Spatial Information Sciences, 40, 45-52. (Year: 2015).*

Z. L. Langford, J. Kumar and F. M. Hoffman, "Convolutional Neural Network Approach for Mapping Arctic Vegetation Using Multi-Sensor Remote Sensing Fusion," 2017 IEEE International Conference on Data Mining Workshops (ICDMW), New Orleans, LA, USA, 2017, pp. 322-331, doi: 10.1109/ICDMW.2017.48. (Year: 2017).*

Zhang, X., Wu, B., Zhu, L., Tian, F., & Zhang, M. (2018). Land use mapping in the Three Gorges Reservoir Area based on semantic segmentation deep learning method. arXiv preprint arXiv:1804.00498. (Year: 2018).*

Verma, D., & Jana, A. (2019). LULC classification methodology based on simple Convolutional Neural Network to map complex urban forms at finer scale: Evidence from Mumbai. arXiv preprint arXiv:1909.09774. (Year: 2019).*

Onim, M. S. H., Ehtesham, A. R. B., Anbar, A., Islam, A. N., & Rahman, A. M. (Nov. 2020). LULC classification by semantic segmentation of satellite images using FastFCN. In 2020 2nd International Conference on Advanced Information and Communication Technology (ICAICT) (pp. 471-475). IEEE. (Year: 2020).*

Malinowski, Radek, Stanisław Lewiński, Marcin Rybicki, Ewa Gromny, Małgorzata Jenerowicz, Michał Krupiński, Artur Nowakowski et al. "Automated production of a land cover/use map of Europe based on Sentinel-2 imagery." Remote Sensing 12, No. 21 (2020): 3523. (Year: 2020).*

Xu, Z., Su, C., & Zhang, X. (2021). A semantic segmentation method with category boundary for Land Use and Land Cover (LULC) mapping of Very-High Resolution (VHR) remote sensing image. International Journal of Remote Sensing, 42(8), 3146-3165. https://doi.org/10.1080/01431161.2020.1871100 (Year: 2021).*

Langford et al., "Convolutional Neural Network Approach for Mapping Arctic Vegetation using Multi-Sensor Remote Sensing Fusion," IEEE International Conference on Data Mining Workshops, pp. 322-331 (Nov. 18, 2017).

Onim et al., "LULC classification by semantic segmentation of satellite images using FastFCN," IEEE 2nd ICAICT, pp. 471-475 (Nov. 28, 2020).

Jijon-Palma et al., "Improving stacked-autoencoders with 1D convolutional-nets for hyperspectral image land-cover classification," Journal of Applied Remote Sensing, 15(2): 026506-1-026506-18 (Apr. 29, 2021).

Verma et al., "LULC classification methodology based on simple Convolutional Neural Network to map complex urban forms at finer scale: Evidence from Mumbai," ARXIV.Org, Cornell University Library, pp. 1-28 (2019).

Vooban, "Satellite Image Segmentation: a Workflow with U-Net," https://medium.com/vooban-ai/satellite-image-segmentation-a-workflow-with-u-net-7ff992b2a56e (Aug. 24, 2017).

Zhang et al., "Land use mapping in the Three Gorges Reservoir Area based on semantic segmentation deep learning method," ARXIV.Org, Cornell University Library, pp. 1-28 (Mar. 18, 2018).

Github, "Implementation of deep learning framework—Unet, using Keras", U-Net: Convolutional Networks for Biomedical Image Segmentation, available online at: <https://github.com/zhixuhao/unet>, 3 pages.

Itti, L., et al., "A principled approach to detecting surprising events in video", 2005 IEEE Computer Society Conference on Computer Vision and Pattern Recognition (CVPR'05), Jun. 2005, 7 pages.

Karra, K., et al., "Global land use / land cover with Sentinel 2 and deep learning", 2021 IEEE International Geoscience and Remote Sensing Symposium IGARSS, Jul. 2021, 4 pages.

Perikamana, K. K., et al., "A CNN based method for Sub-pixel Urban Land Cover Classification using Landsat-5™ and Resourcesat-1 LISS-IV Imagery", Arxiv. Org, Dec. 16, 2021, 29 pages.

Ronneberger, O., "U-Net: Convolutional Networks for Biomedical Image Segmentation", Medical Image Computing and Computer-Assisted Intervention—MICCAI 2015, vol. 9351, Nov. 18, 2015, 8 pages.

Stanford Alpaca, "Stanford Alpaca: An Instruction-following LLAMA Model", available online at: <https://github.com/tatsu-lab/stanford_alpaca>, 5 pages.

Wei, J., et al., "Chain-of-Thought Prompting Elicits Reasoning in Large Language Models", Advances in Neural Information Processing Systems 35 (NeurIPS 2022), 2022, 43 pages.

Campos-Taberner, M., et al., "Understanding deep learning in land use classification based on Sentinel-2 time series," Nature, Scientific Reports 10, Article No. 17188 , Oct. 14, 2020, 12 pages.

Zhu, Z., "Continuous change detection and classification of land cover using all available Landsat data," Dissertation, Boston University, 2013, 178 pages.

Li, E., et al. "High-Resolution Imagery Classification Based on Different Levels of Information", Dec. 5, 2019, Remote Sensing, vol. 11, Issue 24, pp. 2916.

Xu, Z. et al., "A semantic segmentation method with category boundary for Land Use and Land Cover (LULC) mapping of Very-High Resolution (VHR) remote sensing image", International Journal of Remote Sensing, Jan. 28, 2021, vol. 42, Issue 8, pp. 3146-3165.

Fan, R., et al., "SpinNet: Spinning convolutional network for lane boundary detection", Computational Visual Media, vol. 5, No. 4, Dec. 2019, pp. 417-428.

Nguyen, N., et al., "Robust Boundary Segmentation in Medical Images Using a Consecutive Deep Encoder-Decoder Network", IEEE Access, vol. 7, Mar. 10, 2019, pp. 33795-33808.

Shrestha, U., et al., "Automatic Tumor Segmentation using Machine Learning Classifiers", 2018 IEEE International Conference on Electro/Information Technology (EIT), Oct. 21, 2018, Rochester, MI, USA, pp. 0153-0158.

Taravat, A., et al., "Advanced Fully Convolutional Networks for Agricultural Field Boundary Detection", Remote Sens., vol. 13, Feb. 16, 2021, pp. 1-11.

Waldner, F., et al., "Deep learning on edge: extracting field boundaries from satellite images with a convolutional neural network", Remote Sensing of Environment, vol. 245, Feb. 3, 2020, pp. 1-18.

* cited by examiner

Spatial distribution of the validation dataset

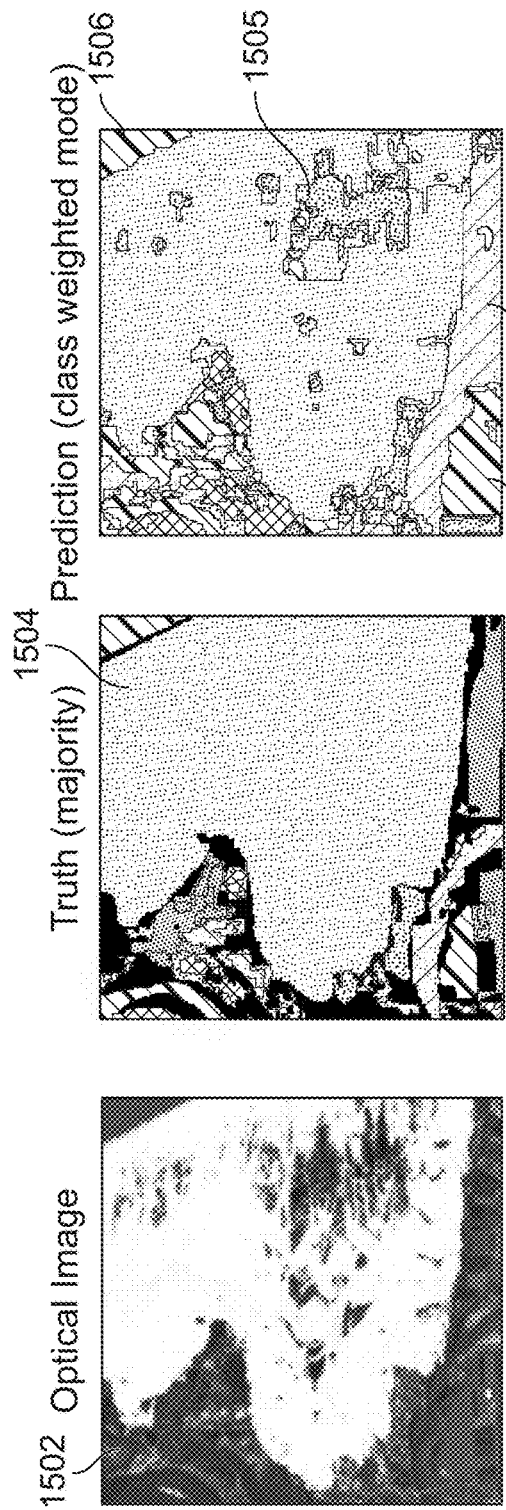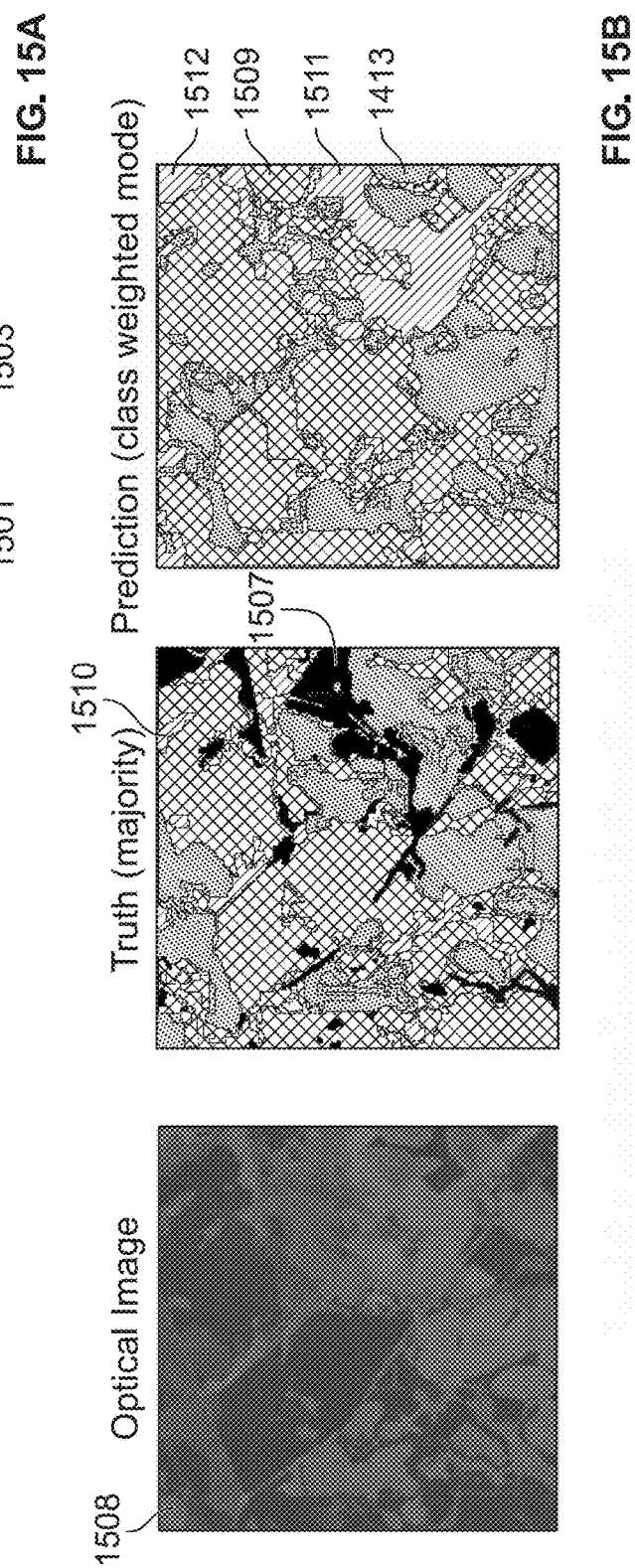

SYSTEMS AND METHODS FOR CATEGORIZING IMAGE PIXELS

CROSS-REFERENCE TO RELATED APPLICATIONS

This application claims the benefit 35 U.S.C. § 119(e) of U.S. Provisional Application No. 63/214,174 filed Jun. 23, 2021, which is hereby incorporated by reference herein in its entirety.

BACKGROUND

The present disclosure is directed towards categorizing image pixels. More particularly, the present disclosure is directed towards machine learning models for categorizing image pixels such as images of land use or land cover.

SUMMARY

Over the last several decades, human-induced land use/land cover (LULC) change has affected ecosystems across the globe. LULC maps are foundational geospatial data products needed by analysts and decision makers across governments, civil society, industry, and finance to monitor global environmental change and measure risk to sustainable livelihoods and development. While there is an unprecedented amount of Earth observation imagery data available to track change, analyses must be automated in order to scale globally. In one approach, individual pixels of an image may be classified, e.g., based on a color of the pixel, and global maps having a resolution ranging from 30 meters per pixel to 500 meters per pixel are generated. However, there is a strong need for an improved high-level, automated geospatial analysis solution that can better convert the abundant pixel data into actionable insights for non-geospatial experts.

To overcome these problems, systems and methods are provided herein for training a machine learning model to categorize each pixel of an input overhead image by receiving, by processing circuitry, a plurality of overhead images, each comprising a respective plurality of pixels, where each pixel of each overhead image of the plurality of overhead images is designated as being of a particular mapping category of a plurality of mapping categories. The processing circuitry may be configured to train a machine learning model to categorize each pixel of the input overhead image using the plurality of overhead images.

In addition, systems and methods are provided herein for generating a map by predicting to which mapping category of a plurality of mapping categories each pixel of a plurality of overhead images belongs. Such systems and method may include processing circuitry configured to input the plurality of overhead images to the trained machine learning model, and determine, using the trained machine learning model, for each pixel of the plurality of overhead images, to which mapping category of the plurality of mapping categories the pixel belongs. The processing circuitry may generate the map of a geographic area associated with the plurality of overhead images based on the plurality of overhead images and on the determined categories. In some embodiments, generating the map comprises generating the map at a resolution of 10 meters per pixel.

In the provided systems and methods for training the machine learning model, for each pixel of each respective overhead image, the designation of the particular mapping category may be appended to the respective overhead image and/or the designation of the particular mapping category may be stored at a database. In some embodiments, the training of the machine learning model comprises using boundary information that indicates where boundaries between regions of pixels of different categories are located, where the overhead image may be annotated to comprise an indication of the boundary information (e.g., a dense labeling of pixels and neighboring pixels). Such boundary information may enable the machine learning model to learn patterns and characteristics of boundaries between certain regions of pixels of different categories, and explore spatial and spectral features to more accurately and efficiently categorize pixels.

In some embodiments, training the machine learning model further comprises biasing each of the respective plurality of mapping categories based on, for example, a frequency of occurrence of the mapping category in the plurality of overhead images. In this way, certain underrepresented mapping categories may be accounted for to correct any imbalances in the training dataset.

In some embodiments, each overhead image of the plurality of overhead images comprises a satellite image or other aerial image that is of a predefined dimensioned area of the planet. In some aspects of this disclosure, training the machine learning model may further comprise using three-dimensional terrain information to train the machine learning model. In some embodiments, the machine learning model may be trained using any suitable types of imagery, e.g., visible or infrared optical images, synthetic aperture radar images, medium wave or long wave thermal infrared images, hyperspectral images, or any other suitable images, or any combination thereof.

In the provided systems and methods for determining, using the trained machine learning model, to which mapping category of the plurality of mapping categories the pixel belongs, the plurality of overhead images may have been captured at a plurality of times during a time period, and the generated map may be of the geographic area over the time period. In some embodiments, the map may comprise a temporal axis.

In some embodiments, generating the map comprises generating a composite image based on the plurality of overhead images and on the determined categories. In some embodiments, the composite image may be generated for a particular time interval, e.g., a few days, a month, a year, a meteorological season, an agricultural season, or any other suitable time interval. The composite image may comprise a plurality of pixels each of which respectively corresponds to a pixel included in each of the plurality of overhead images. The processing circuitry may be configured to generate the composite image of the geographic area by identifying, for each pixel of the plurality of overhead images of the geographic area, a particular mapping category that is determined most frequently (or most confidently) by the trained machine learning model over the time period. In some embodiments, the processing circuitry may analyze composite images or maps from previous years matching the specific time of year requested for a new composite image or map to be generated. For example, if a requested time period for the composite image is spring of 2022, a particular mapping category that is determined most frequently (or most confidently) in spring of 2021 for the geographic area (and/or for spring of any other suitable year(s)) may be taken into account when generating the composite image. In some embodiments, For each respective pixel of the composite image, the processing circuitry may cause the pixel to be represented as being of the same particular mapping category that is identified for the pixel of the plurality of overhead images that corresponds to the pixel of the composite image.

In some aspects of this disclosure, generating the map comprises formulating a class weighted mode parameter based on a probability (or likelihood or confidence or similarity to a training pixel) associated with each mapping category; and a desired weight of a particular mapping category of the plurality of mapping categories with respect to the other mapping categories of the plurality of mapping categories. The plurality of mapping categories may comprise at least grass, flooded vegetation, crops, bare ground, snow/ice and clouds, and formulating the class weighted mode may comprise assigning higher weights to each of the grass and flooded vegetation categories as compared to the crops, bare ground, snow/ice, and clouds categories.

In some aspects of this disclosure, formulating the class weighted mode parameter based on a desired weight of a particular mapping category of the plurality of mapping categories with respect to the other mapping categories of the plurality of mapping categories comprises assigning a first set of weights for the plurality of mapping categories to a particular geographic region as compared to other geographic regions.

In some embodiments, the processing circuitry may be configured to generate a plurality of maps of a plurality of geographic areas associated with the plurality of overhead images based on the plurality of overhead images and on the determined categories, and composite the plurality of maps together to generate a composite map comprising each of the plurality of geographic areas. The composite map may comprise a global map.

In some embodiments, the processing circuitry may be configured to receive feedback information from the trained machine learning model, and determine, based on the feedback information, that an additional training overhead image is necessary. The processing circuitry may obtain one or more additional training overhead images, update the plurality of training overhead images with the one or more additional training overhead images, and update the trained machine learning model using the updated plurality of training overhead images. Such features may facilitate gathering additional training data such as, for example, for particular geographical locations and/or particular mapping categories associated with low confidence results.

In some embodiments, the processing circuitry may be configured to receive feedback information from the trained machine learning model, and determine, based on the feedback information, that one or more mapping category designations for respective pixels of at least one of the plurality of training overhead images need to be updated. The processing circuitry may be configured to update the one or more mapping category designations for the respective pixels of the at least one of the plurality of training overhead images, and update the trained machine learning model using the updated one or more mapping category designations.

In some embodiments, the trained machine learning model may implemented at particular equipment, where the particular equipment comprises the processing circuitry that is configured to receive the feedback information from the trained machine learning model. The particular equipment may comprise one or more sensors configured to capture the additional training overhead image, and the processing circuitry of the particular equipment is configured to perform the updating of the plurality of training overhead images with the additional training overhead image and the updating of the trained machine learning model using the updated plurality of training overhead images.

In some embodiments, the plurality of overhead images (e.g., input to the trained machine learning model) may be captured by one or more imagery sources corresponding to at least one of a visible or infrared optical imagery source, a synthetic aperture radar imagery source, or a medium wave or long wave thermal infrared imagery source. In some embodiments, generating the map comprises generating the map at a resolution based on upsampling or down sampling an intrinsic resolution of the one or more imagery sources.

In some embodiments, a non-transitory computer-readable medium may be provided having non-transitory computer-readable instructions encoded thereon that, when executed by a processor, cause the processor to receive a plurality of overhead images, each comprising a respective plurality of pixels, wherein each pixel of each overhead image of the plurality of overhead images is designated as being of a particular mapping category of a plurality of mapping categories, and train a machine learning model to categorize each pixel of the input overhead image using the plurality of overhead images.

In some embodiments, a non-transitory computer-readable medium may be provided having non-transitory computer-readable instructions encoded thereon that, when executed by a processor, cause the processor to input the plurality of overhead images to a trained machine learning model; determine, using the trained machine learning model, for each pixel of the plurality of overhead images, to which mapping category of the plurality of mapping categories the pixel belongs; and generate, using processing circuitry, the map of a geographic area associated with the plurality of overhead images based on the plurality of overhead images and on the determined categories. The machine learning model is trained by executing instructions to cause the processor to receive a plurality of training overhead images, each comprising a respective plurality of pixels, wherein each pixel of each training overhead image of the plurality of training overhead images is designated as being of a particular mapping category of a plurality of mapping categories, and train a machine learning model to categorize each pixel of an input overhead image using the plurality of training overhead images.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIGS. 15A-15B show illustrative resulting images when a machine learning model is deployed along with a class weighted mode, in accordance with some embodiments of this disclosure;

BRIEF DESCRIPTION

Figure 1:
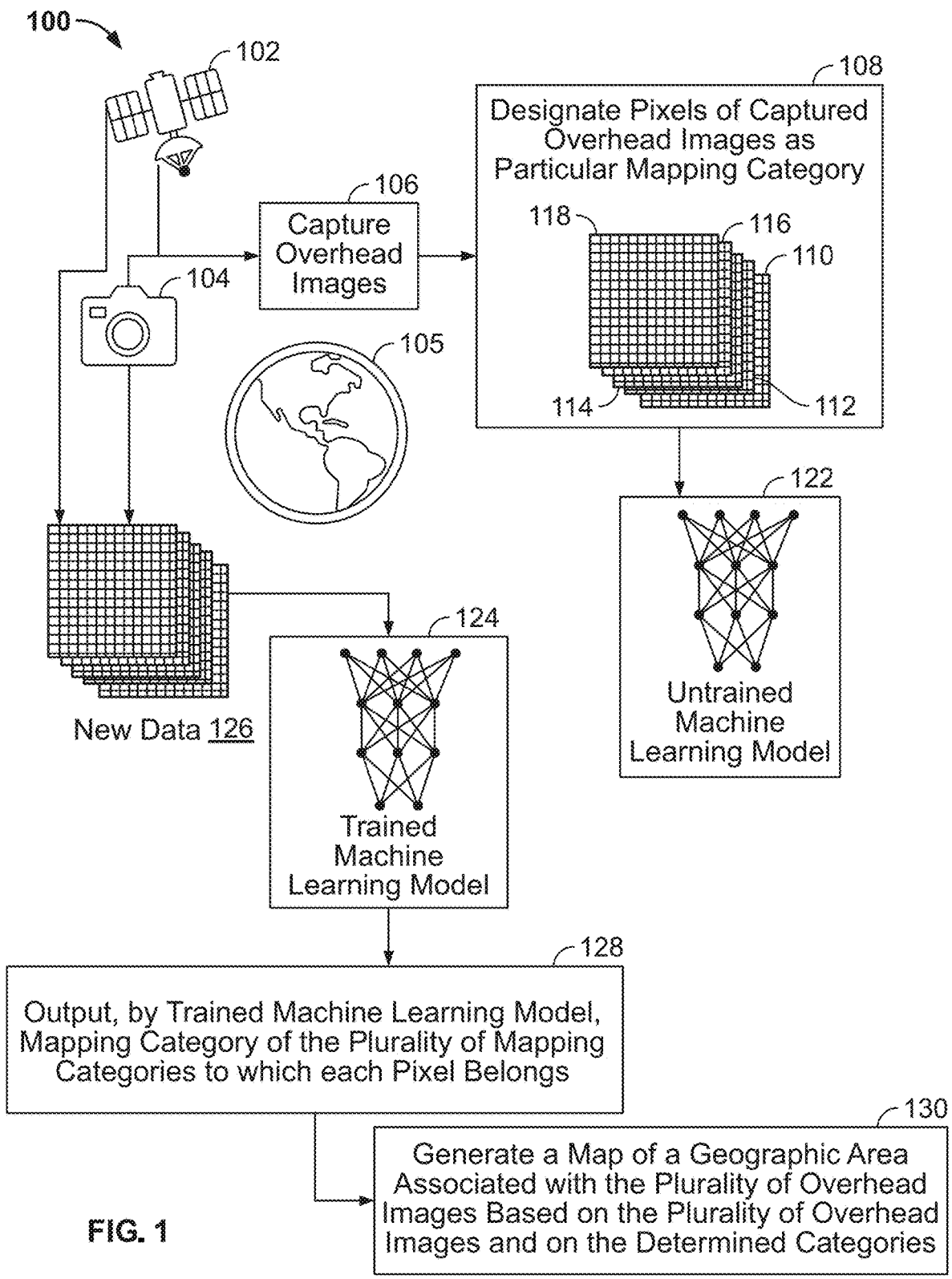
FIG. 1 shows an illustrative block diagram of a system for training a machine learning model to categorize each pixel of an input overhead image, and generating a map by classifying to which mapping category of a plurality of mapping categories each pixel of a plurality of overhead images belongs, in accordance with some embodiments of this disclosure.

FIG. 1 shows an illustrative block diagram of a system 100 for training a machine learning model to categorize each pixel of an input overhead image, and generating a map based on classifying to which mapping category of a plurality of mapping categories each pixel of a plurality of overhead images belongs, in accordance with some embodiments of this disclosure. System 100 may include one or more satellites or other aircraft 102 having one or more imaging devices 104 (e.g., mounted in aircraft 102 or other aircraft, such as, for example, a satellite spacecraft, drone, balloon, helicopter, airplane, any other suitable aircraft, or any combination thereof) configured to capture overhead images 106 (e.g., satellite images and/or other aerial images and any other suitable images, or any combination thereof) of planet 105 (e.g., planet earth). Imaging device 104 may include an image sensor (e.g., directed towards the surface of planet 105) configured to receive light from its surrounding environment, and generate image data based on the received light. In some embodiments, a heterogeneous set of imaging sensors may be employed by imaging device 104. For example, visible or infrared optical images, synthetic aperture radar images, medium wave or long wave thermal infrared images, hyperspectral images, or any other suitable images, or any combination thereof, may be captured by such heterogeneous set of imaging sensors, and one or more mapping categories to which one or more of the pixels thereof correspond to may be identified. In some embodiments, any suitable sensor may be utilized to emit and/or receive energy for use in capturing and generating overhead images 106.

Figure 2:
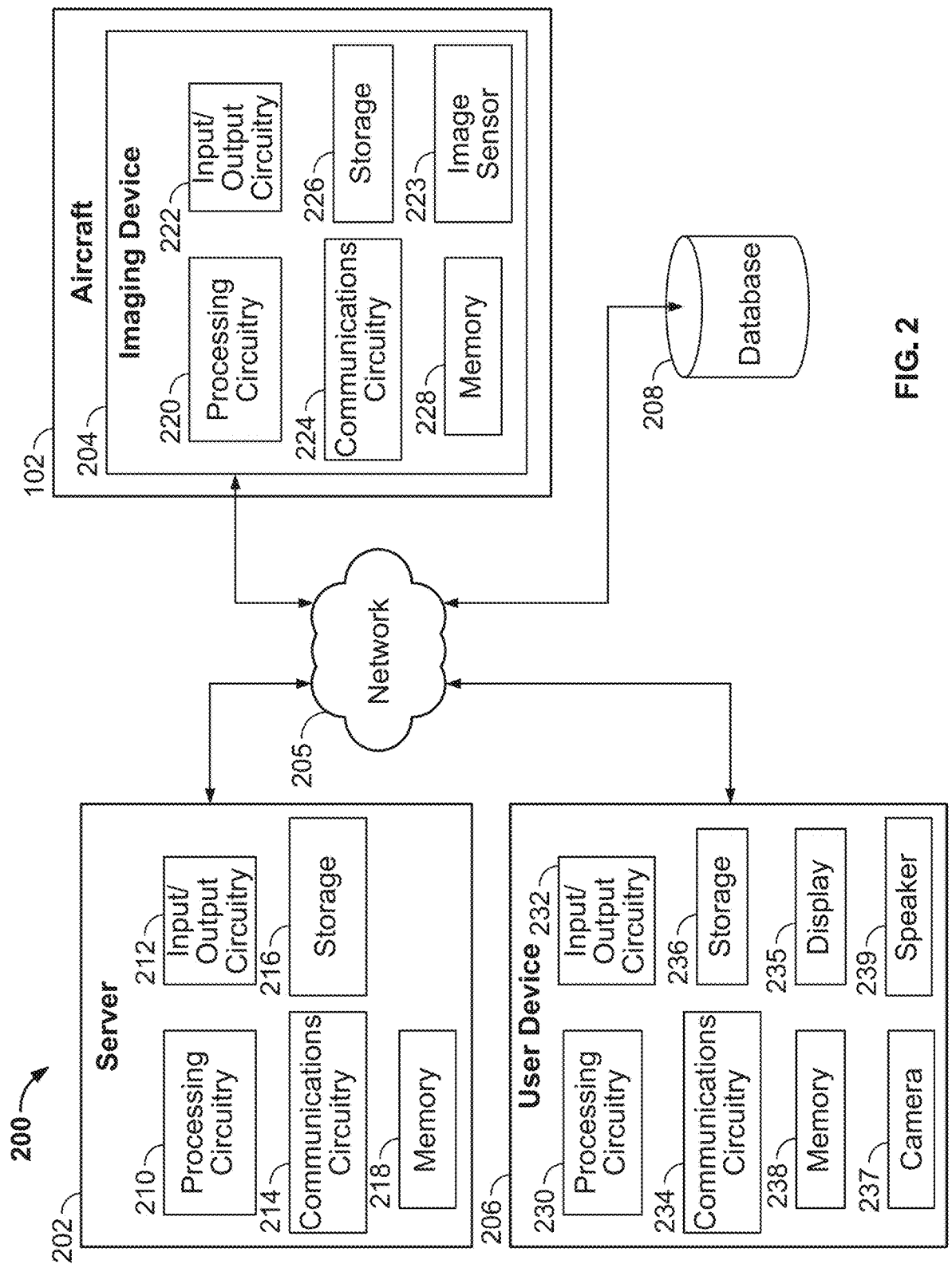
FIG. 2 shows an illustrative block diagram of a system for training a machine learning model to categorize each pixel of an input overhead image, and generating a map by classifying to which mapping category of a plurality of mapping categories each pixel of a plurality of overhead images belongs, in accordance with some embodiments of this disclosure.

At 108, the overhead images captured at 106 may be received and/or captured by a mapping system (e.g., implemented at one or more of server 202, imaging device 204, user device 206, database 208 of FIG. 2, or at aircraft 102 or another suitable vehicle or device configured to capture images, or distributed across one or more of any other suitable device, or any combination thereof). In some embodiments, the mapping system may designate (e.g., based on annotations by a human editor) each pixel of the overhead images as belonging to a particular mapping category, for use in training untrained machine learning model 122 (e.g., corresponding to model 305 of FIG. 3). In some embodiments, less than 100% of a scene may be labeled, and annotators may label the scene for a set time period prior to moving on to a next scene to be labeled. In some embodiments, the particular mapping category may be selected from among discrete land use/land cover (LULC) categories or classes, e.g., clouds, snow/ice, grass, trees, cropland, built area, bare ground, flooded vegetation, water, scrub or scrubland/shrub or shrubland, forest, grassland, rangeland, and/or any other suitable mapping category, or any combination thereof. In some embodiments, the mapping system may employ a "no data" class for unlabeled pixels (e.g., when certain pixels are ambiguous or human editors are otherwise unable to determine a suitable mapping category for one or more of such pixels). In some embodiments, the training data used to train untrained machine learning model 122 may comprise training overhead images of a predefined dimensioned area of the planet (e.g., 24,000 5 km×5 km images or 100 km×100 km images collectively comprising over 5 billion human-labeled pixels, where each image may each be 510×510 pixel RGB natural-color images, or any other suitable number of images of any suitable numbers of pixels). The training data may correspond to captured images of various geographic areas spanning various time ranges (e.g., over a 6 month period of time, over a period of time of one year, or any other suitable time range). The mapping system may utilize artificial intelligence (AI) powered algorithms and on-demand data to bring sustainability and environmental risk analysis for governments, non-profit organizations, companies, and markets, or any other suitable entity, or any combination thereof.

The mapping system may retrieve (e.g., from one or more of one or more of server 202, user device 206, or database 208 of FIG. 2, or one or more of any other suitable device, or any combination thereof) the captured overhead images and associated designations of pixels of the captured images determined at 108, and use such images and corresponding pixel designations to train untrained machine learning model 122. The mapping system may cause training overhead images (e.g., images 110, 112, 114, 116, 118 captured at 106 of FIG. 1) to have an associated mapping category appended thereto for each pixel of the training overhead images, e.g., as part of an image file for input to train the machine learning model, and/or the designation of the particular mapping category may be stored at a database (e.g., database 208 of FIG. 2) and input to untrained machine learning model 122 in association with the overhead training image corresponding to the designation. Based on the training data, untrained machine learning model 122 may learn certain patterns and characteristics indicative of particular mapping categories for use in categorizing pixels of training images into particular mapping categories. In some embodiments, the training data may include images of scenes across the globe at individual points in time or snapshots in time, over a predefined period (e.g., one year or any other suitable time period). In some embodiments, the mapping system may exclude from training images having more than a predefined amount (e.g., 15%) of the "no data" class, and/or the mapping system may classify pixels as "no data" if the probability or confidence score of other classes is below a certain threshold. In some embodiments, the mapping system may utilize synthetic-aperture radar (SAR) techniques to generate imagery, which may be labeled and used to train untrained machine learning model 122, in addition to or alternative to the labeled overhead imagery. Training of the machine learning model is discussed in more detail in connection with FIG. 3.

Based on the aforementioned techniques, untrained machine learning model 122 may be trained to correspond to trained machine learning model 124. The mapping system may utilize trained machine learning model 124 by inputting new data 126 (e.g., overhead images captured by aircraft 102, imaging device 104, or captured or retrieved from any suitable device, or any combination thereof) to trained machine learning model 124. Trained machine learning model 124 model may be configured to output, at 128, a mapping category of a plurality of mapping categories to which each pixel of the images associated with new data 126 belongs. For example, trained machine learning model 124 may be configured to output respective probabilities that a particular pixel belongs to a particular class (e.g., from among clouds, snow/ice, grass, trees, cropland, built area, bare ground, flooded vegetation, water, and/or scrub/shrub, or any other suitable mapping class, or any combination thereof). Based on such probabilities, a particular class may be selected by the mapping system. New data 126 may comprise images captured at a plurality of geographic areas across planet 105 at a plurality of times throughout a predefined time period (e.g., one year). In some embodiments, trained machine learning model 124 may be configured to take as input one overhead image and output a map of the geographic area corresponding to the overhead image comprising indications of one or more mapping categories of pixels of the input overhead image. In some embodiments, additional mapping categories may be used to train the model and may be recognized by the trained model, e.g., in addition to categorizing one or more pixels as trees, the model may output a prediction that the one or more pixels are part of a particular type of forest (or any other suitable mapping class, or any combination thereof), such as, for example, a deciduous forest, or any other suitable forest, or any combination thereof. In some embodiments, the map generated by the mapping system may encompass a specific time range.

At 130, the mapping system may generate a map of a geographic area associated with the plurality of overhead images input to the trained machine learning model at 124, based on the plurality of overhead images and on the mapping categories determined at 128. In some embodiments, the mapping system may account for cloud cover variability and possible gaps in data coverage by utilizing multiple observations of a particular geographic area in generating a map of a plurality of geographic areas (e.g., a world map, or a map of a portion of interest in the world, or any other suitable planet, or any combination thereof) to create a seamless LULC map over a particular time interval (e.g., one year, or any other suitable time interval). The mapping system may employ scene selection logic, e.g., by selecting the least cloudy scenes for an overhead image tile, and more scenes in very cloudy areas may be incorporated for a partial region whereas less scenes may be incorporated in mostly cloud-free areas. In some embodiments, the mapping system may subdivide an image tile may into, e.g., 5 km×5 km image chips with 1 km overlap, or any other suitable image dimensions or any other suitable overlap amount. The mapping system may generate a final map using any suitable technique (e.g., by computing or formulating a class weighted mode across all the predictions of model, where the class weighted mode may incorporate the mapping category classification, the associated probability, and a custom class weight per pixel, as discussed in more detail below). In some embodiments, the mapping system may utilize a custom weight per class, which may be akin to a seasonal adjustment, and which may emphasize ephemeral classes that may only occur a few times per year (e.g. grass, or any other suitable class, or any combination thereof) and/or de-emphasize more common classes and/or de-emphasize transient classes (e.g., snow/ice, or any other suitable class, or any combination thereof).

In some embodiments, the mapping system may generate a global map by processing any suitable number of images (e.g., over 20,000 Sentinel 2 tiles across the entire Earth's land surface, which may be surface reflectance corrected imagery accessed from the Microsoft Planetary Computer, or any other suitable number of images associated with any other suitable aircraft and any suitable imagery platform, or any combination thereof). In some embodiments, the mapping system may generate the global map in near real time (e.g., approximately 7 days). For example, such processing may require approximately 1.2 million core hours of compute time, and the mapping system may leverage third party cloud computing resources such as, for example, Microsoft Azure Batch (e.g., over a million cores, and running up to 6400 cores simultaneously, or any other suitable processing parameters and any other suitable cloud computing resource, or any combination thereof) and/or Amazon Web Services resources. In some embodiments, the mapping system may generate a global map at 10 meter resolution (e.g., a single pixel may represent an area on the ground of 10 m×10 m), or any other suitable high resolution may be employed, and/or may incorporate imagery from across an entire year. In some embodiments, the mapping system may generate maps of any suitable number of geographic areas, and composite such maps together to create a map that includes all of the geographic areas desired to be represented in the global map. In some embodiments, the mapping system may generate maps that exceed the training set by a large amount (e.g., the global map may be 300× larger than the training set). In some embodiments, the plurality of overhead images may be captured by one or more imagery sources corresponding to at least one of a visible or infrared optical imagery source, a synthetic aperture radar imagery source, or a medium wave or long wave thermal infrared imagery source, and the mapping system may generate the map at a resolution based on upsampling or down sampling an intrinsic resolution of such one or more imagery sources.

FIG. 2 shows an illustrative block diagram of a system 200 for training a machine learning model to categorize each pixel of an input overhead image, and generating a map based on classifying to which mapping category of a plurality of mapping categories each pixel of a plurality of overhead images belongs, in accordance with some embodiments of this disclosure. System 200 may comprise one or more of server 202, one or more of imaging device 204, one or more of user device 206, and one or more of database 208, each of which may communicate with each other via network 205. Network 205 may comprise any suitable network (e.g., satellite network, cellular network, and/or the Internet, including a WAN and/or a LAN, or any combination thereof). In some embodiments, system 200 may be utilized to implement the mapping system. The mapping system may comprise hardware, software, or any combination thereof for providing the functionality described herein. The mapping system may be implemented in one location at one device or distributed across different locations across different devices (e.g., using processing circuitry 210, processing circuitry 220, processing circuitry 230, or any other suitable components, or any suitable combination thereof). The mapping system may enable automated LULC mapping from time series observations, by employing a systematic (e.g., algorithmic) technique to deploy the machine learning model over large arbitrary areas of interest while including relevant data across a particular time period (e.g., one year, or any other suitable time period).

Server 202 may comprise one of more servers having processing circuitry 210 which may comprise hardware, software or any combination thereof, such as, for example, one or more central processing units (CPUs) or processors configured to execute instructions stored in computer-readable media (e.g., memory 218 and/or storage 216) to implement operating system(s) and applications of system 200 and perform and/or control various operations on data and other computations. For example, processing circuitry 210 may be configured to train the machine learning model (e.g., at 122 of FIG. 1), input captured images (e.g., new data 126 of FIG. 1) to the machine learning model, and receive output of a mapping category for each pixel of the input images (e.g., at 128 of FIG. 1), and generate a map associated with the plurality of overhead images (e.g., at 130 of FIG. 1). Server 202 may further comprise input/output circuitry 212 and/or communications circuitry 214 configured to receive input and/or communications (e.g., based on input received at user device 206 in communication with server 202 over network 205). In some embodiments, input/output circuitry 212 and/or communications circuitry 214 may be configured to receive overhead images (e.g., from another server or a database and/or captured at imaging device 204) and designation of particular mapping categories of respective pixels of the received images (e.g., from database 208 and/or otherwise appended to the overhead images). In some embodiments, server 202 may comprise a plurality of servers (e.g., as part of cloud computing resources) that may be configured to run the trained machine learning model and/or generate a map based on the output of the trained machine learning model. Storage 216 and/or memory 218 of server 202 may comprise one or more of, for example, Random Access Memory (RAM), Read Only Memory (ROM), EEPROM, ASIC, optical storage, magnetic storage, flash memory, solid state memory, or any other suitable medium used to store data, or any combination thereof. Storage 216 and/or memory 218 may be configured to store one or more applications (e.g., in non-transitory medium) executable by processing circuitry 210 to implement the techniques discussed above and below. In some embodiments, at least a portion of training data, and/or associated metadata, and/or at least a portion of the machine learning model and associated parameters or hyperparameters may be stored at server 202. In some embodiments, server 202 may comprise a collection of servers, and processing circuitry of server 202 can be distributed across a number of servers.

Imaging device 204 may comprise processing circuitry 220, input/output circuitry 222, communications circuitry 224, storage 226, memory 238, which may be implemented in a similar manner as processing circuitry 210, input/output circuitry 212, communications circuitry 214, storage 216 and memory 218, respectively, of server 202. Imaging device 204 (e.g., mounted on aircraft 102 of FIG. 1 or other aircraft and directed towards planet 105 of FIG. 1, such as, for example, planet earth) may include image sensor 223 which may be configured to detect light, e.g., passed or transmitted through one or more filters. In some embodiments, image sensor 223 may be a charge-coupled device (CCD) or complementary metal oxide semiconductor (CMOS) sensors. Image sensor 223 may generate image data based on the detected light, e.g., by converting light comprising photons to electrical signals. Processing circuitry 220 may be configured to perform image processing on the image data generated by image sensor 223. For example, processing circuitry 220 may cause the image data generated by image sensor 223 to be stored in memory 228 and/or storage 226, and processing circuitry 220 may analyze or operate on a plurality of pixels of the image data. In some embodiments, input/output circuitry 222 and/or communications circuitry 224 may be configured to transmit images of various geographical areas over a predefined period of time (e.g., one year) to one or more of server 202 and/or user device 206 and/or database 208. In some embodiments, imaging device 204 may utilize one or more of a variety of techniques to generate image data (e.g., SAR, hyperspectral imaging, etc.). In some embodiments, imaging device 204 may be configured to capture and/or process, and provide to the machine learning model for training and/or processing, any suitable types of imagery, e.g., visible or infrared optical images, synthetic aperture radar images, medium wave or long wave thermal infrared images, hyperspectral images, or any other suitable images, or any combination thereof. In some embodiments, a classification of the type of imagery of image data may be appended to the image or otherwise stored at a database, e.g., database 208. Ins some embodiments, the machine learning model may be configured to extract the different complementary information in the different types of images from the different imagery sources, and may leverage such information for data fusion and improved performance of the machine learning model.

In some embodiments, the machine learning model may be implemented at least in part at aircraft 102 (e.g., satellite or a drone or any other suitable vehicle or device) which also has the capability of collecting image data, such as, for example, via imaging device 204 which may be mounted or positioned on aircraft 102. In some embodiments, at least a portion of training data, and/or associated metadata, and/or at least a portion of the machine learning model and associated parameters or hyperparameters may be stored at aircraft 102.

User device 206 may comprise processing circuitry 230, input/output circuitry 232, communications circuitry 234, storage 236, memory 728, which may be implemented in a similar manner as processing circuitry 210, input/output circuitry 212, communications circuitry 214, storage 216 and memory 218, respectively, of server 202. In some embodiments, input/output circuitry 232 and/or communications circuitry 234 may be configured to receive images of various geographical areas over a predefined period of time (e.g., one year), and may receive input (e.g., from human editors) labeling pixels of the received images as belonging to a particular mapping category. The captured images received at user device 206 may be presented to the human editors by way of display 235. In some embodiments, user device 206 may comprise camera 237 and speaker 239. Processing circuitry 230 may be configured to train the machine learning model based on the captured overhead training images and/or transmit the captured images and associated labels to server 202 for training. In some embodiments, user device 206 may be configured to generate a map of a particular geographic area (e.g., a global map) over a predefined period of time (e.g., one year) based on a plurality of outputs of the machine learning model. User device 206 may be configured to receive input to instruct the machine learning model to be executed and/or to receive input instructing execution of techniques to generate a map based on the output of the trained machine learning model. User device 206 may correspond to any suitable device (e.g., a desktop computer, a laptop computer, a television, a mobile device, a smartphone, a tablet, or any other suitable device, or any other combination thereof). In some embodiments, at least a portion of training data, and/or associated metadata, and/or at least a portion of the machine learning model and associated parameters or hyperparameters may be stored at user device 206.

Database 208 may be configured to be in communication (e.g., over network 205) of server 202, imaging device 204 and/or user device. In some embodiments, database 208 may store indications of a particular mapping category for each pixel of a plurality of pixels of overhead images (e.g., captured at 106, based on input received from human editors). In some embodiments, in training the machine learning model, one or more of server 202 and/or user device 206 may retrieve or otherwise request such mapping category information matching a current image being used to train the machine learning model. For example, database 208 may store an identifier for a particular image, and identifiers for individual pixels of the image, and provide the appropriate information upon request, where the receiving device may associate the received mapping categories with images of the pixels and input such information to the machine learning model. Database 208 may comprise any suitable formatted data structure. In some embodiments, database 208 may be relational database, a self-referential database, or a distributed database, or any combination thereof. Any suitable technique may be used to communicate with, and access database records stored at, database 208 (e.g., SQL). In some embodiments, database 208 may be configured to store images or references to network locations of images (e.g., overhead training images captured at 106 of FIG. 1 and/or overhead images captured at 126). In some embodiments, at least a portion of training data, and/or associated metadata, and/or at least a portion of the machine learning model and associated parameters or hyperparameters may be stored at database 208.

Figure 3:
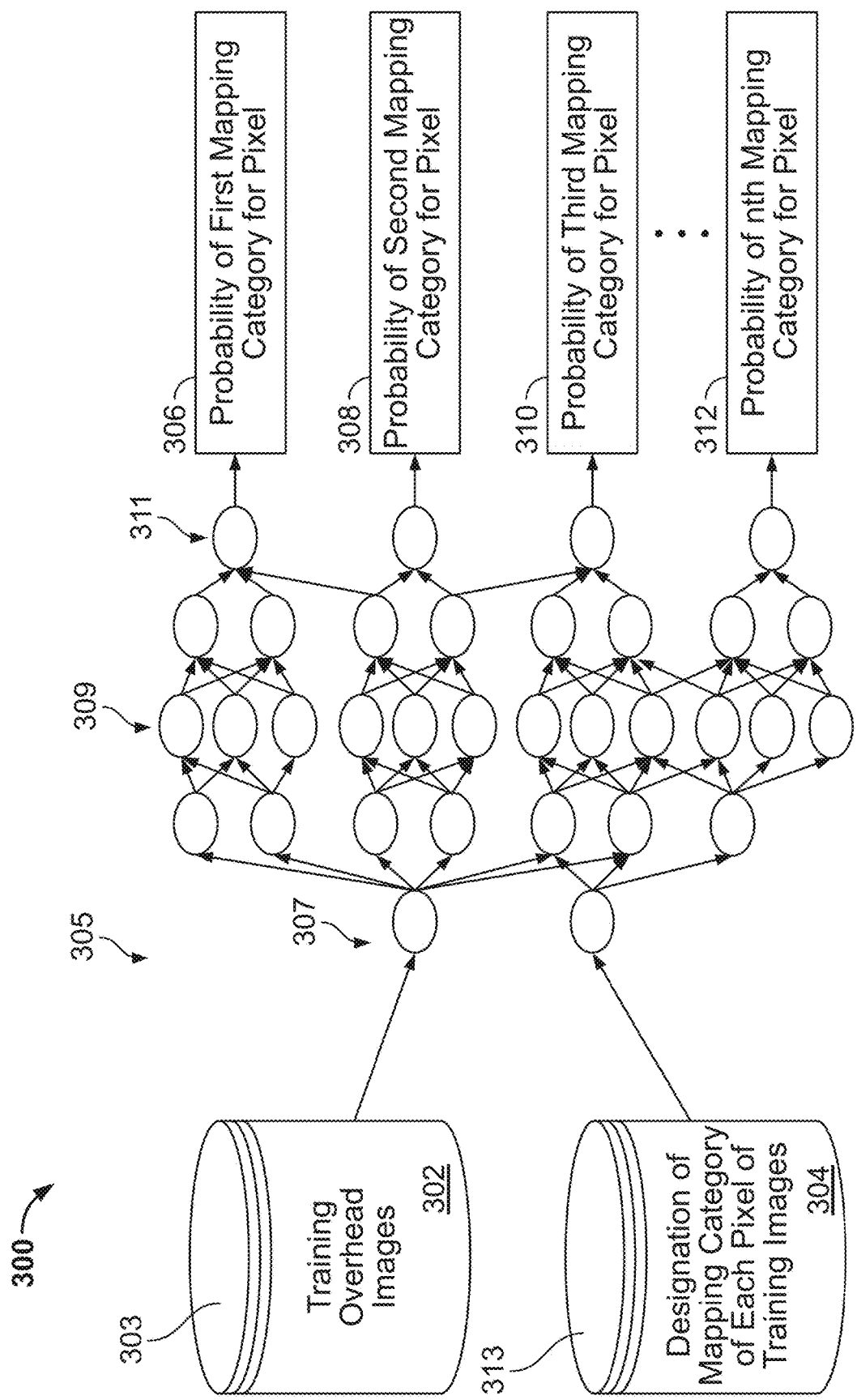
FIG. 3 shows an illustrative block diagram of a system for training a machine learning model to categorize each pixel of an input overhead image, in accordance with some embodiments of this disclosure.

FIG. 3 shows an illustrative block diagram of a system 300 for training a machine learning model 305 to categorize each pixel of an input overhead image, in accordance with some embodiments of this disclosure. System 300 may correspond to the mapping system discussed herein. In some embodiments, machine learning model 305 may be a deep learning based segmentation model, e.g., a neural network machine learning model, or any other suitable model, or any combination thereof. The neural network may employ input layer 307 having one or more input nodes, an output layer 311 having one or more output nodes, and one or more hidden layers 309 (between the input layer and output layer) comprising a plurality of nodes and connections between the nodes, where the connections may represent parameters (e.g., weights and/or biases, or any other suitable techniques, or any combination thereof) learned during training (e.g., using backpropagation techniques, or any other suitable techniques, or any combination thereof) of model 305 with training data 302. In some embodiments, machine learning model 305 may be a convolutional neural network (CNN) machine learning model used to categorize input images into a particular mapping category. A CNN may leverage the fact that neighboring pixels tend to be similar to each other, e.g., tend to be of a similar or the same color or otherwise have similar characteristics. More specifically, the CNN model may be used to extract image features and automatically learn suitable weights during training by applying a filter (e.g., 3×3 pixels, or any other suitable dimensions) to input images, where the filter is slid around the image to be overlaid on different pixels of the input image and convolved with overlapping pixels. A bias value may be applied to a filter output, and the biased filter output may be added to a feature map, and pooling may be applied to the feature maps, e.g., to select a maximum value in each region to be used as inputs to the neural network.

In some embodiments, machine learning model 305 may employ a CNN having a U-Net architecture specifically tailored for image segmentation. The U-Net architecture is discussed in more detail in Ronneberger et al., "U-Net: Convolutional Networks for Biomedical Image Segmentation," In: Navab N., Hornegger J., Wells W., Frangi A. (eds) Medical Image Computing and Computer-Assisted Intervention—MICCAI 2015, Lecture Notes in Computer Science, vol 9351, the disclosure of which is hereby incorporated by reference herein in its entirety. In some embodiments, machine learning model 305 may include one or more modifications to the U-Net architecture that is discussed in Ronneberger et al. For example, while the CNN of Ronneberger et al. utilizes two 3×3 unpadded convolutions, machine learning model 305 may employ the "same" padding (i.e., addition of pixels to the edge of an image) such that a suitable amount of pixels are utilized to ensure that an output of model 305 matches images input to model 305 (e.g., for each image, 510×510 pixels, 10 m per pixel).

Model 305 may be trained for any suitable number of epochs (e.g., 100, or any other suitable number) using the training overhead images, e.g., stored at database 303 (which may correspond to database 208 of FIG. 2 or any other suitable database, or any combination thereof) and/or otherwise received by the mapping system (e.g., at processing circuitry 210 of FIG. 2 of server 202 and/or processing circuitry 230 of user device 206 of FIG. 2) for use in training machine learning model 305. In some embodiments, surface reflectance (e.g., top of atmosphere reflectance) corrected imagery (e.g., full dynamic range, with pixel values scaled 0-255), e.g., captured by the 6-band (e.g., red, green, blue, nir, swir1, swir2, or any other suitable band, or any combination thereof) European Space Agency (ESA) Sentinel-2 Level 2A (L2A) satellite and provided by the Microsoft Planetary Computer, may be employed by the mapping system in training machine learning model 305. For example, such imagery may comprise visible blue, green, and red bands, near infrared and/or ultraviolet, and/or at least two shortwave infrared bands, e.g., Sentinel-2 bands 2, 3, 4, 8, 11, and 12, and may be rescaled from a fixed precision data format (e.g., UInt16 or any other suitable format) to a Float format (e.g., 0.0-1.0) for performed computations. In some embodiments, ten (or any other suitable number) of L2A bands may be used (e.g., three red edge bands and a narrow NIR band may be used in addition to the Sentinel-bands referenced above, or any suitable number or type of bands, or any combination thereof) and/or band ratios (NDVI computed using the red and NIR bands, NDWI, EVI, or any other band ratio, or any combination thereof). In some embodiments, a time series of band ratios (e.g., NDVI, NDWI, and EVI, or any other suitable band ratio, or any combination thereof) of captured overhead training images may be used to train the model, which may enhance the model's ability to detect phenologic patterns (e.g., cropping cycles, grass green-up, seasonally flooded vegetation, or any other suitable pattern, or any combination thereof). Model 305 may be trained for the identified number of epochs to convergence, with a stepped learning rate (e.g., starting at $1e^{-4}$ or any other suitable value) that may be caused by the mapping system to drop an order of magnitude (e.g., up to $1e^{-7}$ or any other suitable value) in response to determining that validation loss begins to plateau or otherwise stops improving.

Model 305 may be trained using the overhead images (e.g., images 110, 112, 114, 116, 118 captured at 106 of FIG. 1, or any other suitable images and any suitable number of images, or any combination thereof), where each pixel of the training overhead images may be designated by the mapping system at 108 (e.g., by a human editor) as belonging to a particular mapping category. In some embodiments, the mapping system may select the particular mapping category from among discrete land use/land cover (LULC) classes, e.g., clouds, snow/ice, grass, trees, cropland, built area, bare ground, flooded vegetation, water, scrub/shrub, or any other suitable mapping category, or any suitable combination thereof. In some embodiments, the mapping system may employ a "no data" class for unlabeled pixels, and images having more than a predefined amount (e.g., 15%, or any other suitable predefined amount) of the "no data" class may be excluded from training, and/or pixels may be predicted as "no data" if the probability of other classes is below a certain threshold. In some embodiments, the training data for use at 122 may comprise training overhead images of a predefined dimensioned area of the planet (e.g., 24,000 5 km×5 km images or 100 km×100 km images collectively comprising over 5 billion human-labeled pixels, or any other suitable dimensioned images and number of images, or any combination thereof). The training dataset may be global and geographically-balanced. In some embodiments, the mapping system may process over 400,000 Earth observations, or any other suitable number of observations, to produce the map. The mapping system may cause the training overhead images to have an associated mapping category appended thereto for each pixel of the training overhead images, e.g., as part of an image file for input to model 305, and/or the designation 304 of the particular mapping category may be stored at database 313 and input to machine learning model 305 in association with the overhead training image corresponding to the designation.

In training machine learning model 305, the mapping system may attempt to minimize a loss function (e.g., categorical cross entropy loss function, or any other suitable loss function, or any combination thereof). The loss function may be weighted using inverse-log weighting based on the percent proportion of each class (e.g., by weighting or biasing one or more under-represented classes higher in the model), to account for class imbalance in the training dataset, or using any other suitable technique, or any combination thereof. In some embodiments, the mapping system may zero out a class weight for unlabeled pixels (i.e., no data), thereby forcing model 305 to ignore unlabeled regions in overhead training images during training. In some embodiments, the mapping system may perform data augmentation, e.g., to randomly flip images vertically and horizontally, which has the effect of introducing more geographic pattern realizations used for training, and/or to apply random color perturbations to change brightness and hue of images used for training. In some embodiments, the mapping system may flip sample weights when flipping images to augment the training dataset. In some embodiments, the mapping system may employ a dropout technique during training, e.g., randomly turning off 20% of the neurons in model 305 in each batch, or any other suitable number of neurons, which may serve a regularization effect so as to prevent overfitting and aid in generalization properties of the model. In some embodiments, the mapping system may cause a certain indication to be made (e.g., a brighter color, or other suitable characteristic) over a region of one or more pixels to indicate stronger weights (e.g., brighter colors, or other suitable characteristic, may be indicative of stronger weights or biases).

Once machine learning model 305 is trained (e.g., to correspond to trained machine learning model 124), such trained model may be configured to output a mapping category of the plurality of mapping categories to which each pixel belongs, e.g., semantically segment land cover types into multiple classes. For example, model 305 may be configured to output probabilities 306, 308, 310, 312, or any other suitable number of probabilities, or any combination thereof. In some embodiments, a softmax layer may be applied (e.g. to obtain a normalized probability distribution) to a last convolutional decoder block of model 305, and the softmax layer may map the output to a probability for each of the classes (e.g., ten classes or any other suitable number of classes), and/or an argmax function may be applied to the probabilities (e.g., to set each probability to zero or one) to yield a final segmentation map which shows a pixel-wise classification of the input image. In some embodiments, model 305 may be trained to recognize that certain mapping categories tend to have a certain amount of heterogeneity, e.g., in the Amazon region of planet earth, many or all pixels may correspond to a forest region, or in the Sahara region of planet earth, many or all pixels may correspond to a desert region, or any other suitable patterns may be employed by the mapping system, or any combination thereof. In some embodiments, a global map of height or topography and/or 3D terrain information may be input to the model, e.g., to enable the model to learn in terms of color and 3D structure (e.g., the model may learn that bare ground is less likely near a city, based on the combination of overhead imagery and the 3D terrain information, and/or the model may learn any suitable number or types of other predictive characteristics in relation to mapping classes).

Figure 4A:
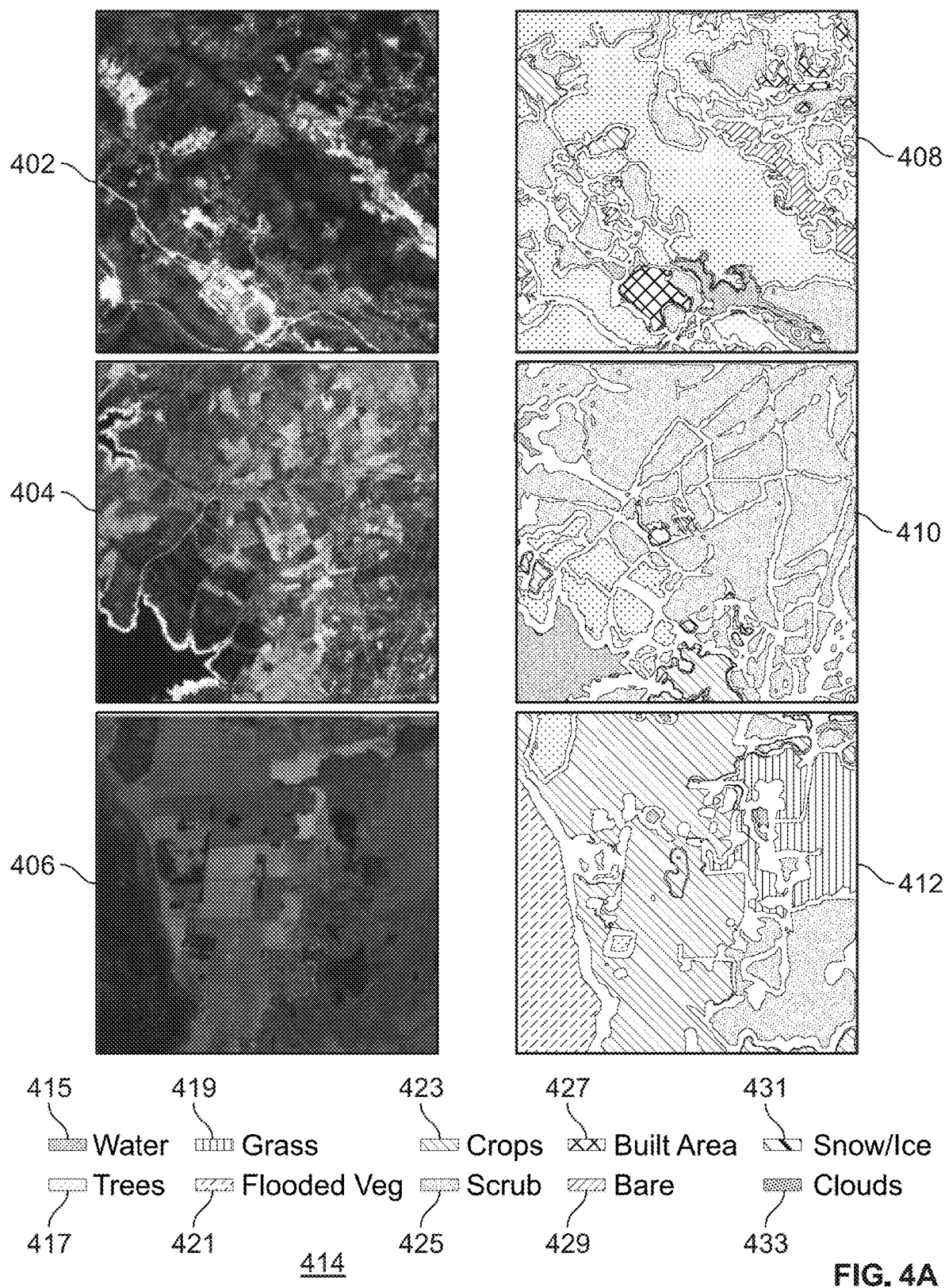
FIGS. 4A-4B show illustrative training images used to train a machine learning model, in accordance with some embodiments of this disclosure.
Figure 4B:
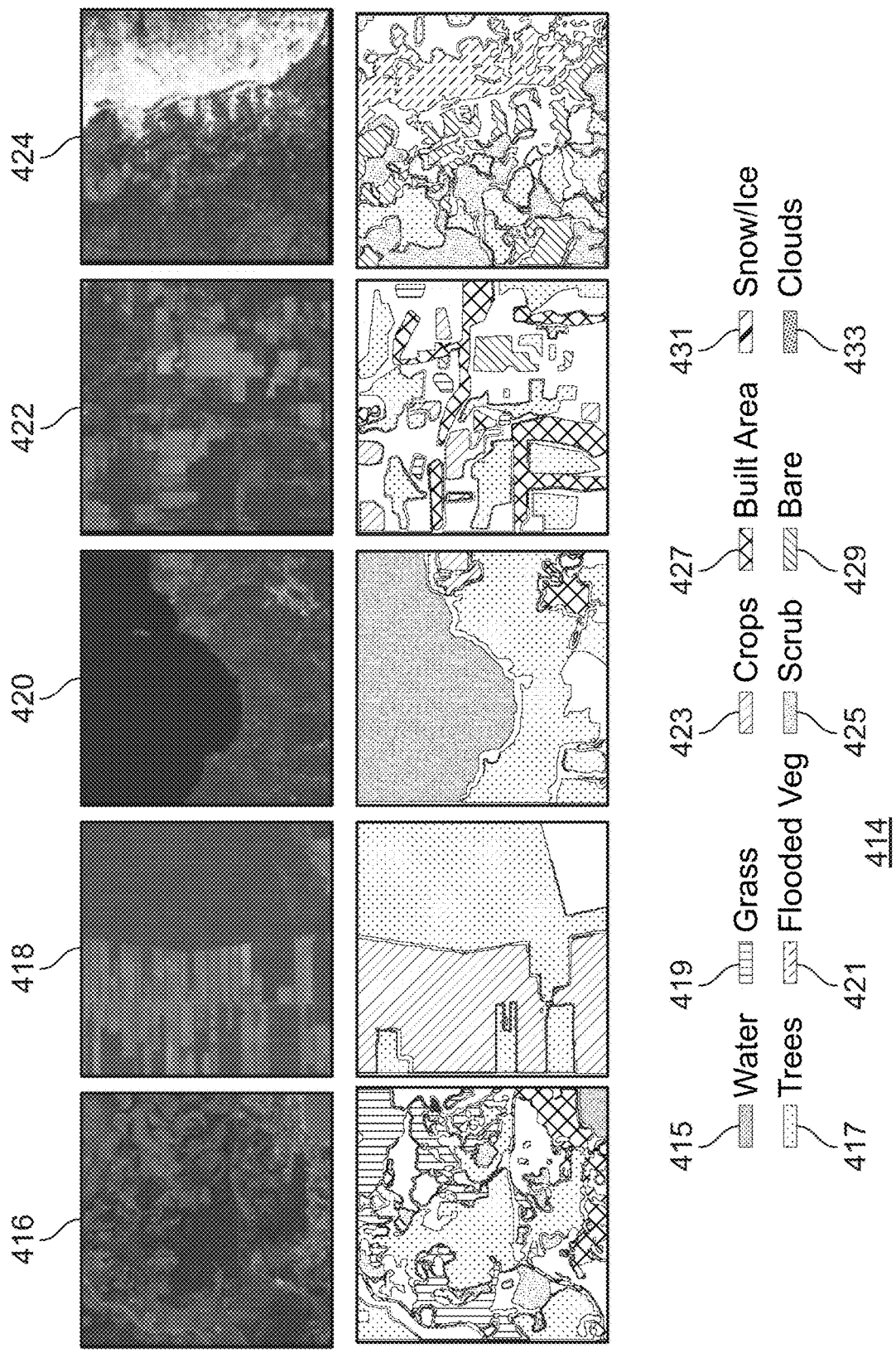

FIGS. 4A-4B show illustrative training images used to train a machine learning model, in accordance with some embodiments of this disclosure. In some embodiments, the mapping system may train machine learning model 305 using boundary information that indicates where boundaries between regions of pixels of different categories are located. For example, the mapping system may enable training overhead images to be annotated or labeled using a dense markup technique, which may comprise drawing or otherwise indicating vector boundaries around individual feature classes (e.g., particular mapping categories) in a particular scene. Such dense labeling may enable machine learning model 305 to learn to recognize patterns associated with spatial and spectral features of boundaries for categorizing images, and may permit a faster recovery of per-pixel labels compared to a single pixel annotation. For example, machine learning model 305 may recognize that a boundary between ocean and desert tends to have certain characteristics, and may be trained to recognize such characteristics in future situations. Any suitable platform (e.g., Labelbox) may be used to draw the vector boundaries around a feature class of an image. In some embodiments, certain mapping categories (e.g., water, trees, crops, built area, bare ground, snow/ice, and/or cloud, and any other suitable mapping category, or any combination thereof) may appear in homogenous agglomerations and lend themselves to being grouped in vector boundaries. In some embodiments, each pixel may be individually labeled as belonging to a particular mapping category without utilizing the dense markup technique, or single pixel labels may be used in combination with dense labeling techniques.

As shown in FIG. 4A, overhead images 402, 404, 406, captured by an imaging device (e.g., aircraft 102, such as, for example, the Sentinel-2 satellite capturing RGB images) may correspond to labeled images 408, 410, 412, respectively. As shown in legend 414 of FIG. 4B, each mapping category may be represented by a corresponding identifier or indicator (e.g., a color, a pattern, or any other suitable distinguishing feature, or any combination thereof) in labeled images 408, 410, 412. Legend 414 may comprise indicator 415 for the water mapping category; indicator 417 for the trees mapping category; indicator 419 for the grass mapping category; indicator 421 for the flooded vegetation mapping category; indicator 423 for the crops mapping category; indicator 425 for the scrubs mapping category; indicator 427 for the built area mapping category; indicator 429 for the bare ground mapping category; indicator 431 for the snow/ice mapping category; and/or indicator 433 for the clouds mapping category, or an indicator for any other suitable mapping category, or any combination thereof. In some embodiments, each labeled image used for training machine learning model 305 may comprise 510×510 pixels (10 m per pixel), or any other suitable number of pixels and/or distance per pixel, or any combination thereof.

FIG. 4B shows overhead images 416, 418, 420, 422, 424 which are labeled by human annotators as shown in labeled overhead training images 426, 428, 430, 432, 434, respectively. Legend 414 of FIG. 4A may be employed in FIG. 4B to identify mapping categories in labeled images 426, 428, 430, 432, 434. In some embodiments, during labeling, certain distinctions may be drawn between overlapping categories (e.g., the built areas mapping category, rather than grass mapping category, may be considered to include lawns and parks). In some embodiments, the mapping system may match a coordinate reference system (CRS) of an input image to the geometry information associated with the training data (e.g., appended as metadata to an image, or using any other suitable technique, or any combination thereof). The training data may comprise any suitable number of examples for each mapping category (e.g., a million examples of a forest region, or any other suitable number of examples for each mapping category) to capture global variability (e.g., a forest in Texas may have different characteristics than a forest in Borneo).

Figure 5:
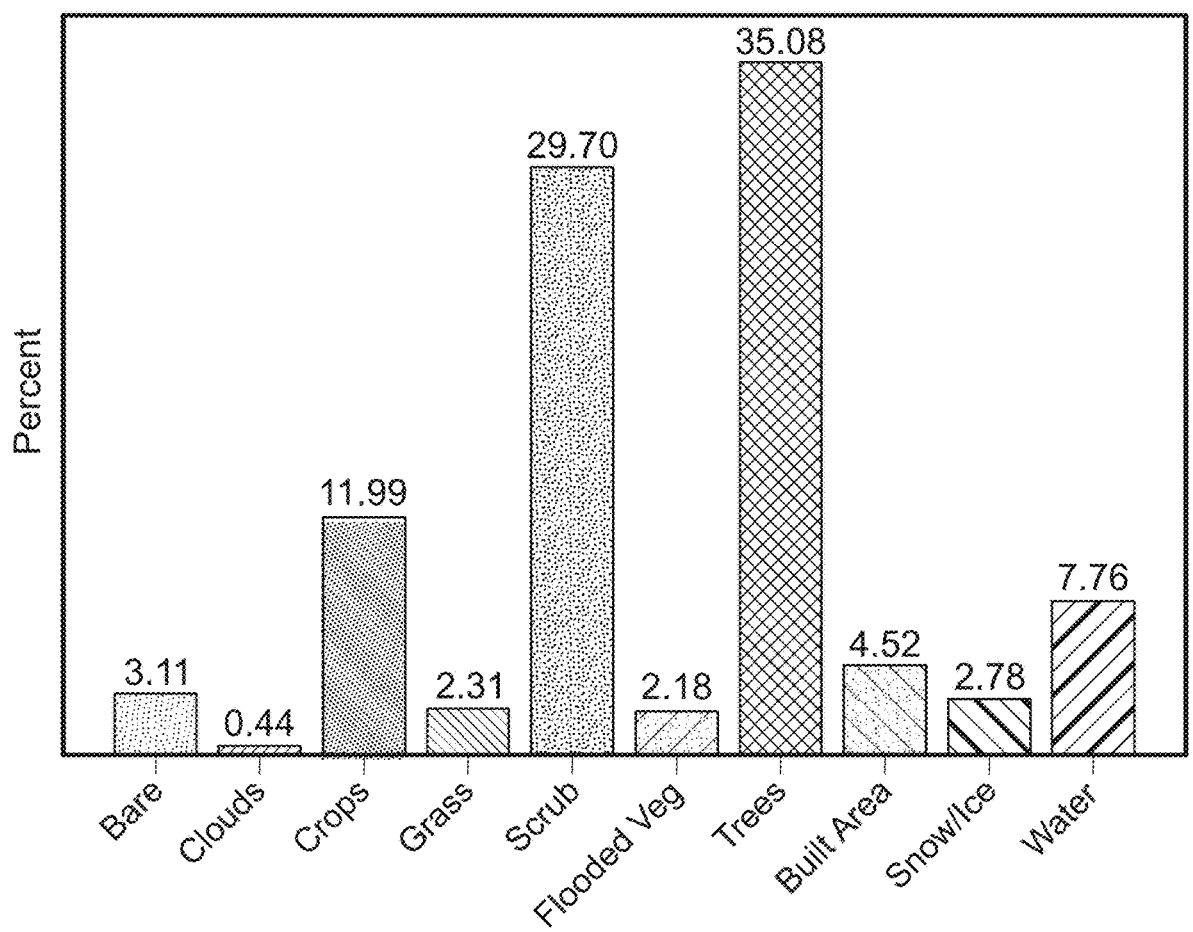
FIG. 5 shows an illustrative distribution of mapping categories of training images used to train a machine learning model, in accordance with some embodiments of this disclosure.
Figure 6:
FIG. 6 shows an illustrative geographic locations and biomes associated with training images used to train a machine learning model, in accordance with some embodiments of this disclosure.

FIG. 5 shows an illustrative distribution of mapping categories of training images used to train a machine learning model, in accordance with some embodiments of this disclosure. Such training images may correspond to geographic areas all over the globe, and across any suitable number of biomes (e.g., 14 biomes, such as for example, as shown in FIG. 6, which shows illustrative geographic locations and biomes associated with training images used to train a machine learning model, in accordance with some embodiments of this disclosure). The images may be collected over the biomes using a random stratified sampling approach, or any other suitable technique, or any combination thereof. In some embodiments, certain categories (e.g., the rock/ice biome category, or any other suitable category, or any suitable combination thereof) may be omitted from the labeled images. The mapping system may weight or bias each class based on a pixel-wise distribution of training data, e.g., based on the computation of natural log(inv(class_pix/total_pix)). For example, each time the model sees an example of a class weight Y, the mapping system may cause such class to be weighted such that the model sees it X*Y times (e.g., if a weight for the bare ground mapping category is 3.5, the model may treat each bare ground pixel as though it has seen it 3.5 times). In some embodiments, the mapping system may de-weight certain mapping categories (e.g., the cloud and snow/ice categories, or any other suitable category, or any combination thereof) in a class weighted mode during model deployment. Such de-weighting may reflect the desire to avoid inferring more frequent mapping category classifications (e.g., clouds in a tropical region, unless clouds consistently appear in images of the region, or snow/ice unless the snow/ice persistently appears in images of a particular region, or any other suitable characteristics in other categories, or any combination thereof). On the other hand, it may be desirable to weight or bias certain mapping categories (e.g., crops or any other suitable category, or any combination thereof) such that a designation of the category should be presented if detected at any point during a desired time frame. Some classes may be under-represented by the model, e.g., grass, flooded vegetation, bare ground, or any other suitable combination, or any combination thereof, which may also change in appearance seasonally (e.g., grass may be green or brown depending on how much rain a region recently received), and thus it may be desirable to weight such classes higher when generating a map (e.g., even if grass isn't the most frequently observed class for a particular pixel, it may be desirable to classify such pixel as grass).

In some embodiments, the mapping system may employ radiometrically-corrected ground range detected (GRD) data, e.g., generated based on images captured by the Sentinel-1 satellite or any other suitable aircraft or image source, in training the model, which may be particularly useful in the model learning the distinction between certain mapping categories, e.g., flooded vegetation versus croplands, bare versus scrub/shrub, or any other suitable distinctions between categories, or any combination thereof. In some embodiments, the mapping system may take into account time-series features (e.g., measures of vegetation health over a year), which may be useful in differentiating between certain mapping categories, e.g., grasslands versus crops versus scrub/shrub, or any other suitable categories, or any combination thereof.

Figure 7:
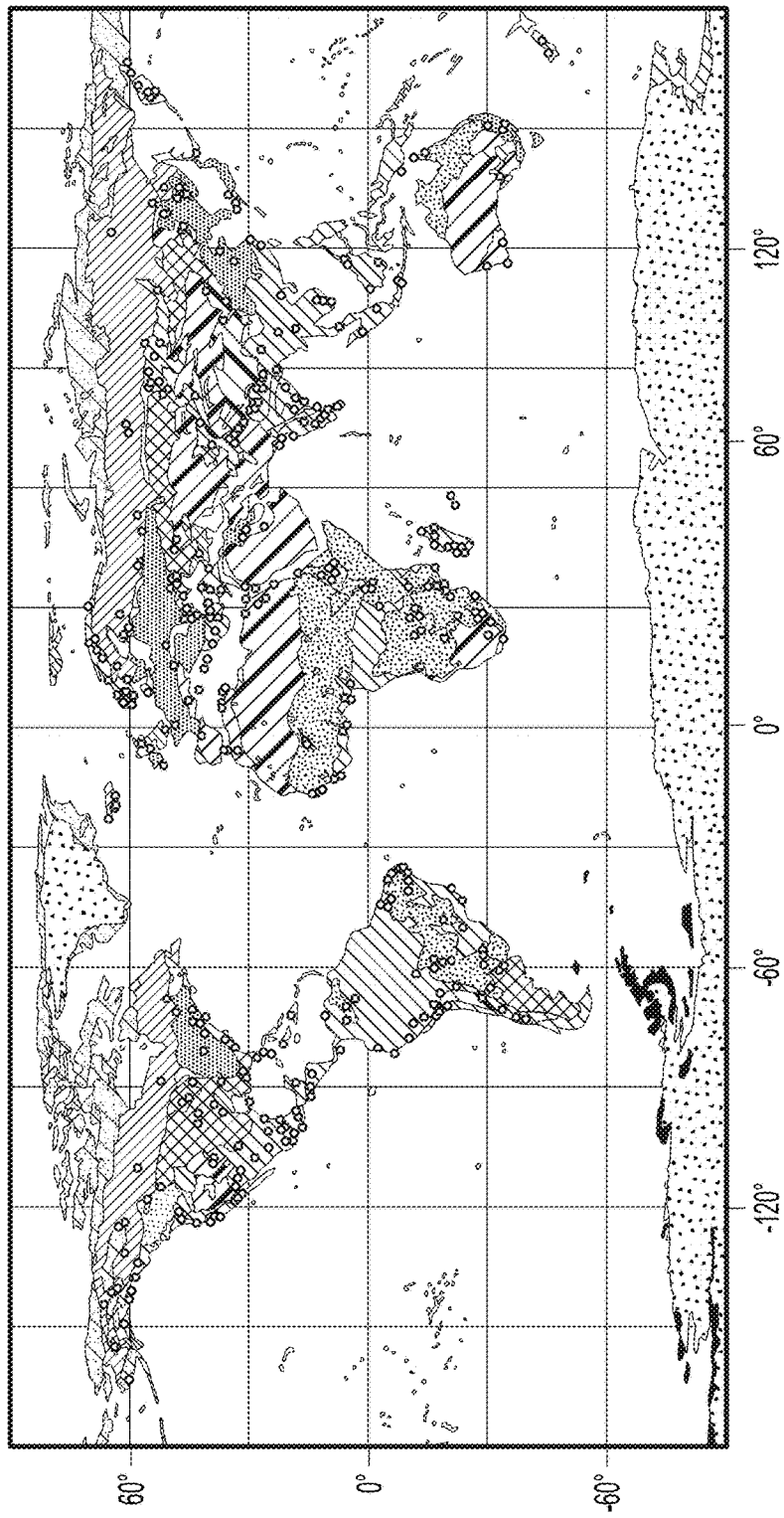
FIG. 7 shows an illustrative spatial distribution of a validation dataset used to tune a machine learning model, in accordance with some embodiments of this disclosure.

FIG. 7 shows an illustrative spatial distribution of a validation dataset used to tune a machine learning model, in accordance with some embodiments of this disclosure. The map system may employ a validation dataset to evaluate machine learning model 305 after model 305 is trained. In some embodiments, the validation data set may correspond to any suitable amount of training data that is entirely excluded from training (e.g., 15% at the end of each epoch, or any other suitable amount) to combat overfitting. In some embodiments, a "gold standard" set of images or tiles (e.g., labeled by multiple expert annotators, where each expert annotator, or a majority of expert annotators that expressed an opinion, or at least a threshold number of experts, agreed on the appropriate mapping category designation for a particular pixel or group of pixels, or any other suitable metric, or any combination thereof) may be utilized as the validation dataset. Images of any suitable number of sample areas (e.g., over 400, spanning the globe from each suitable biome, as shown in FIG. 7, or any other suitable number of areas and/or biomes, or any combination thereof) may be utilized as the validation dataset. In some embodiments, the mapping system may utilize the validation dataset used to tune hyperparameters of the model (e.g., number of hidden units in a layer, learning rate, choice of activation function, or any other suitable parameters, or any combination thereof). The mapping system may generate error matrices based on such validation dataset to report validation statistics compared to the holdout tiles. For example, an error matrix may include an indication of area proportions for each geographic region along with one or more accuracies. From the error matrix over each region, an area of each class may be computed, e.g., with 95% confidence error bounds. In some embodiments, certain biomes (e.g., rock/ice, or any other suitable biomes or any combination thereof) may be excluded from the validation dataset. In some embodiments, the machine learning model may be applied to validation tiles for each biome individually to ensure that no single biome is underperforming.

Figure 8:
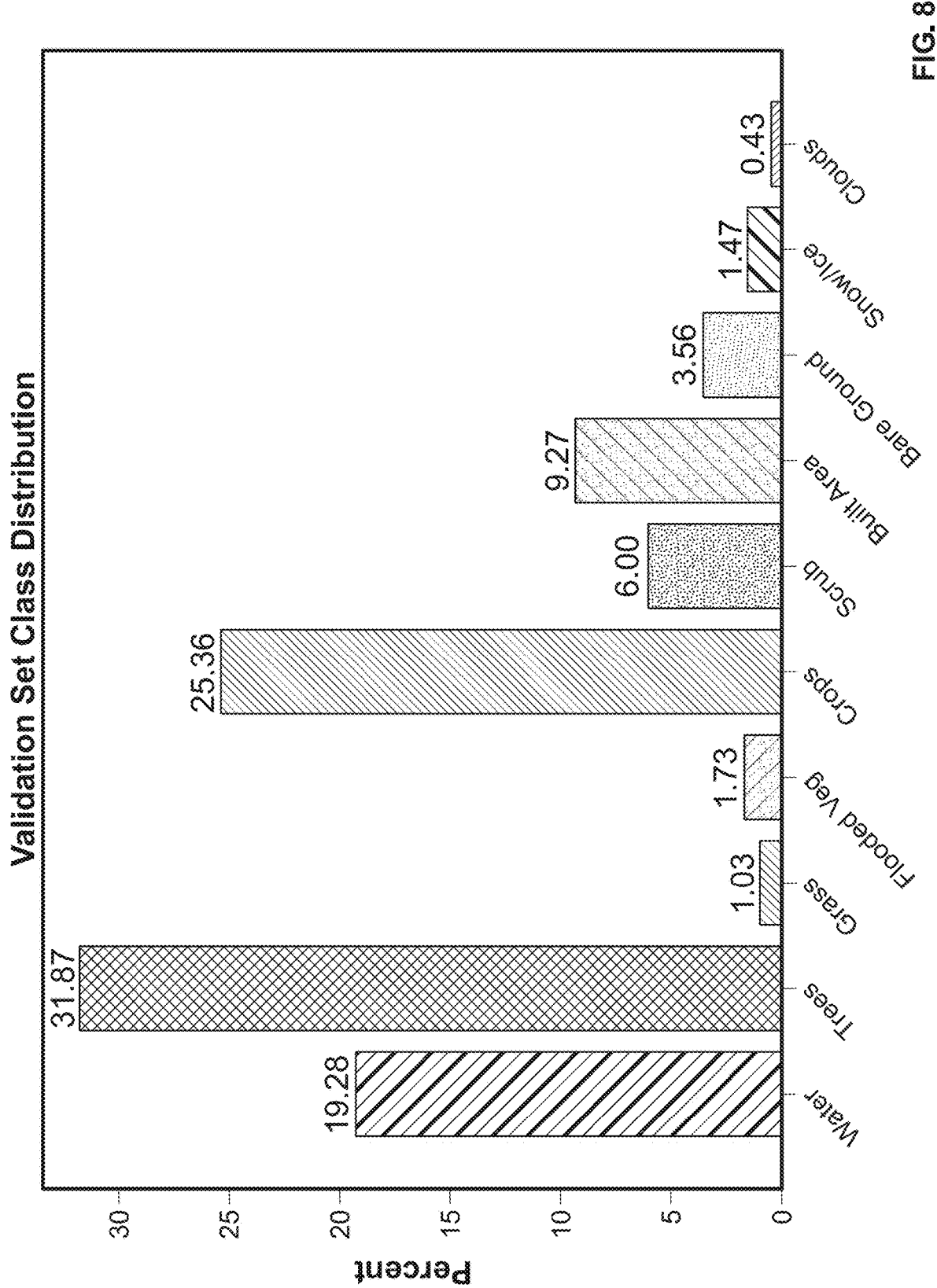
FIG. 8 shows an illustrative distribution of mapping categories of a validation set used to tune a machine learning model, in accordance with some embodiments of this disclosure.

FIG. 8 shows an illustrative distribution of mapping categories of a validation set used to tune a machine learning model, in accordance with some embodiments of this disclosure. In some embodiments, the distribution of mapping categories of the validation dataset may not be evenly balanced, which also may be the case with the training dataset. The distribution of FIG. 8 may correspond to "three expert strict" validation data, e.g., where each of three expert labelers expressed an option on a mapping category of a pixel and agreed on the mapping category classification. Any suitable number of experts may be used in such validation set.

Figure 9:
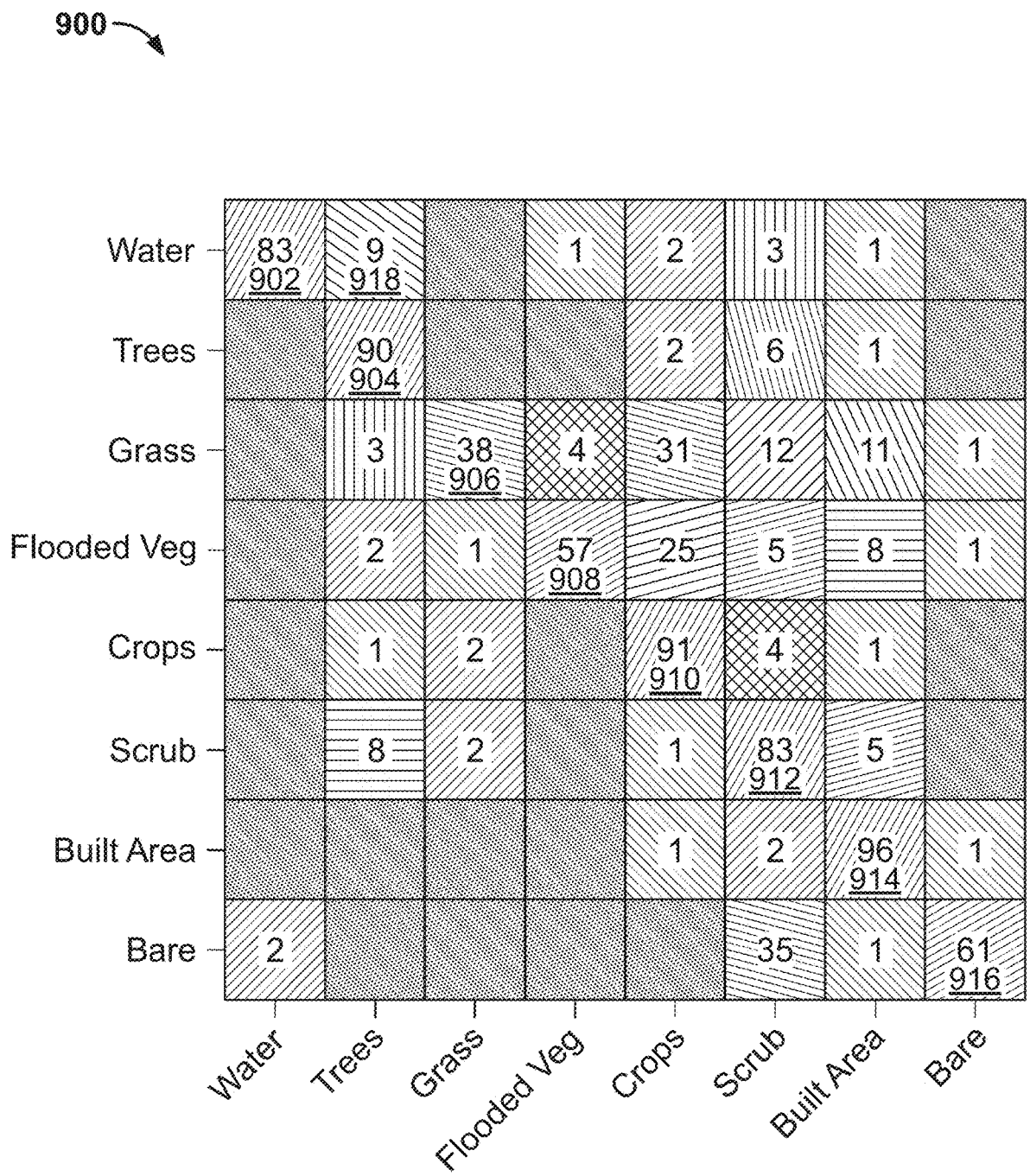
FIG. 9 shows an illustrative confusion matrix used to present validation statistics for a machine learning model, in accordance with some embodiments of this disclosure.

FIG. 9 shows an illustrative confusion matrix used to present validation statistics for a machine learning model, in accordance with some embodiments of this disclosure. Confusion matrix 900 may be generated by the mapping system and may indicate correctly predicted mapping categories in boxes 902, 904, 906, 908, 910, 912, 914, 916 of confusion matrix 900 forming a diagonal through the center of confusion matrix 900. Confusion matrix 900 may indicate, in certain portions of rows or columns thereof, incorrect predictions made on the validation dataset fed into model 305, e.g., box 918 included in the row of the mapping category "water" may indicate the number of pixels incorrectly classified as the mapping category "trees" that were in fact pixels corresponding to the mapping category "water." In the example of FIG. 9, the confusion matrix indicates that a particular machine learning model (e.g., model 305 of FIG. 3) performed at an accuracy of greater than 85%, varying by mapping category, on a validation dataset. In some embodiments, accuracy of predicted mapping categories may tend to be linked to how often a class is seen in a training dataset.

Figure 10:
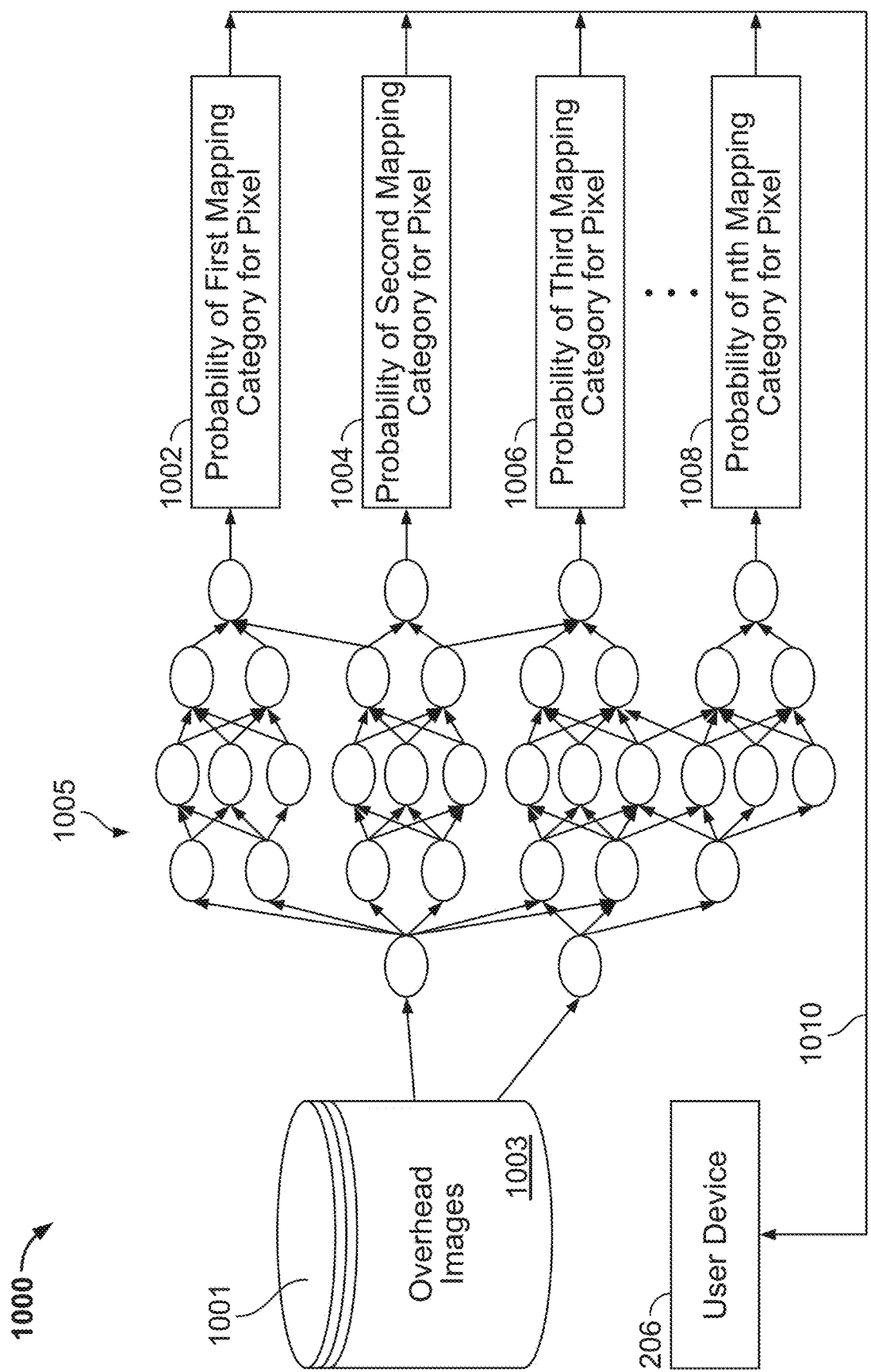
FIG. 10 shows an illustrative block diagram of a system for using a trained machine learning model to categorize each pixel of an input overhead image, in accordance with some embodiments of this disclosure.

FIG. 10 shows an illustrative block diagram of a system 1000 for using a trained machine learning model 1005 to categorize each pixel of an input overhead image, in accordance with some embodiments of this disclosure. In some embodiments, the mapping system may input a test dataset (e.g., stored at database or data structure 1001) to trained machine learning model 1005 (e.g., model 305 of FIG. 3 having had weights and/or biases thereof optimized during training, and/or having hyperparameters thereof tuned using the validation dataset) to test the accuracy of model 1005. In some embodiments, the mapping system may compare a test set accuracy to the validation set accuracy (e.g., to determine whether the model is overfit). Trained machine learning model 1005 may run on-demand for any region and/or timeframe (e.g., a few days, one or more months, one or more years, a meteorological season, an agricultural season, or any other suitable timeframe) and may be configured to receive an input image from among overhead images 1003 (e.g., stored at database or data structure 1001) and output for each pixel of the image a probability that the pixel belongs to a particular mapping category. Trained machine learning model 1005 may be configured to output probabilities 1002, 1004, 1006, 1008 concerning a mapping category for a pixel of an image input to model 1005.

In some embodiments, trained machine learning model 1005 may provide, based on outputs 1002, 1004, 1006 and 1008, feedback information 1010. Feedback information 1010 may comprise confidence information, such as, for example, a numerical confidence score or a flag indicating a level (e.g., high or low) of confidence for a particular output of trained machine learning model 1005. The mapping system may be configured to determine, based on the confidence information indicated in feedback information 1010, that an additional training overhead image is necessary, and, in particular, the type of training overhead image image(s) to obtain based on the images having been determined to have a low enough confidence, e.g., compared to a threshold confidence level. For example, each of outputs 1002, 1004, 1006 and 1008 may be associated with respective confidence scores assigned by trained machine learning model 1005 that may represent the likelihood that a designation of a particular mapping category for a pixel of input overhead images is correct. In some embodiments, the type of image(s) to obtain may correspond to a particular geographic area or portions thereof, and/or one or more particular mapping categories. In some embodiments, the threshold confidence level can be predetermined (e.g., 0.5, or any other suitable value, such as on a scale of zero to one) or dynamic (e.g., variable based on a particular application for the training overhead image, image quality of the training overhead image, equipment used to capture the training overhead image, or based on any other suitable attribute or characteristic associated with the training overhead image, or based on any combination thereof). In some embodiments, the mapping system may be configured to determine, based on the confidence information indicated in feedback information 1010, whether to confirm, add or update mapping category labels for existing training overhead images, e.g., for a particular geographic area or portion thereof. In some embodiments, such as if one or more pixels of the input overhead images input to trained machine learning model 1005 were not labeled, feedback information 1010 may suggest that one or more of such pixels be provided with a label.

In some embodiments, training overhead images 302 may be updated based on the obtained one or more additional training overhead images, and/or based on one or more mapping category designations for the respective pixels of the at least one of the plurality of training overhead images 302. Trained machine learning model 1005 may be updated using the updated plurality of training overhead images. For example, trained machine learning model 1005 may be further trained using the updated plurality of training overhead images comprising the obtained one or more additional training overhead images.

In some embodiments, feedback information 1010 may be provided by trained machine learning model 1005 to user device 206 (and/or or server 202 or any other suitable component of the mapping system) and/or to particular equipment, e.g., aircraft 102, or any other suitable device or vehicle or equipment, or any combination thereof, which may be equipped with a computing system adjacent to or collocated with image sensor 223 and/or any other suitable sensor(s) or imagery source(s). Such computing system of the particular equipment, e.g., processing circuitry, I/O circuitry 222, communications circuitry 224, storage 226, memory 228 and/or any other suitable component or any combination thereof, may be configured to implement trained machine learning model 1005 with image sensor 223 and/or any other suitable sensor(s) or imagery source(s). Processing circuitry 220 of the particular equipment may be configured to receive feedback information 1010 and cause image sensor 223 and/or other suitable sensors to collector updated training data based on feedback information 1010, as well as update the plurality of training overhead images 302 and update machine learning model 1005 using the updated plurality of training overhead images. For example, the particular equipment, e.g., aircraft 102, may be a drone or satellite that uses feedback information 1010 to instruct itself regarding a particular geographic location at which additional images should be captured. In some embodiments, the particular equipment, e.g., aircraft 102, may be in communication with one or more of the components of system 200 which may implement a cloud-based system. Alternatively, the particular equipment, e.g., aircraft 102, may be configured to implement the receiving of feedback information 1010, the determination of whether an additional overhead training image or updated overhead training image in necessary, the updating of the plurality of training overhead images 302 with one or more additional overhead training images and/or one or more updated overhead training images, and the updating of machine learning model 1005 and deployment of the updated machine learning model 1005 in isolation in a closed system.

Figure 11:
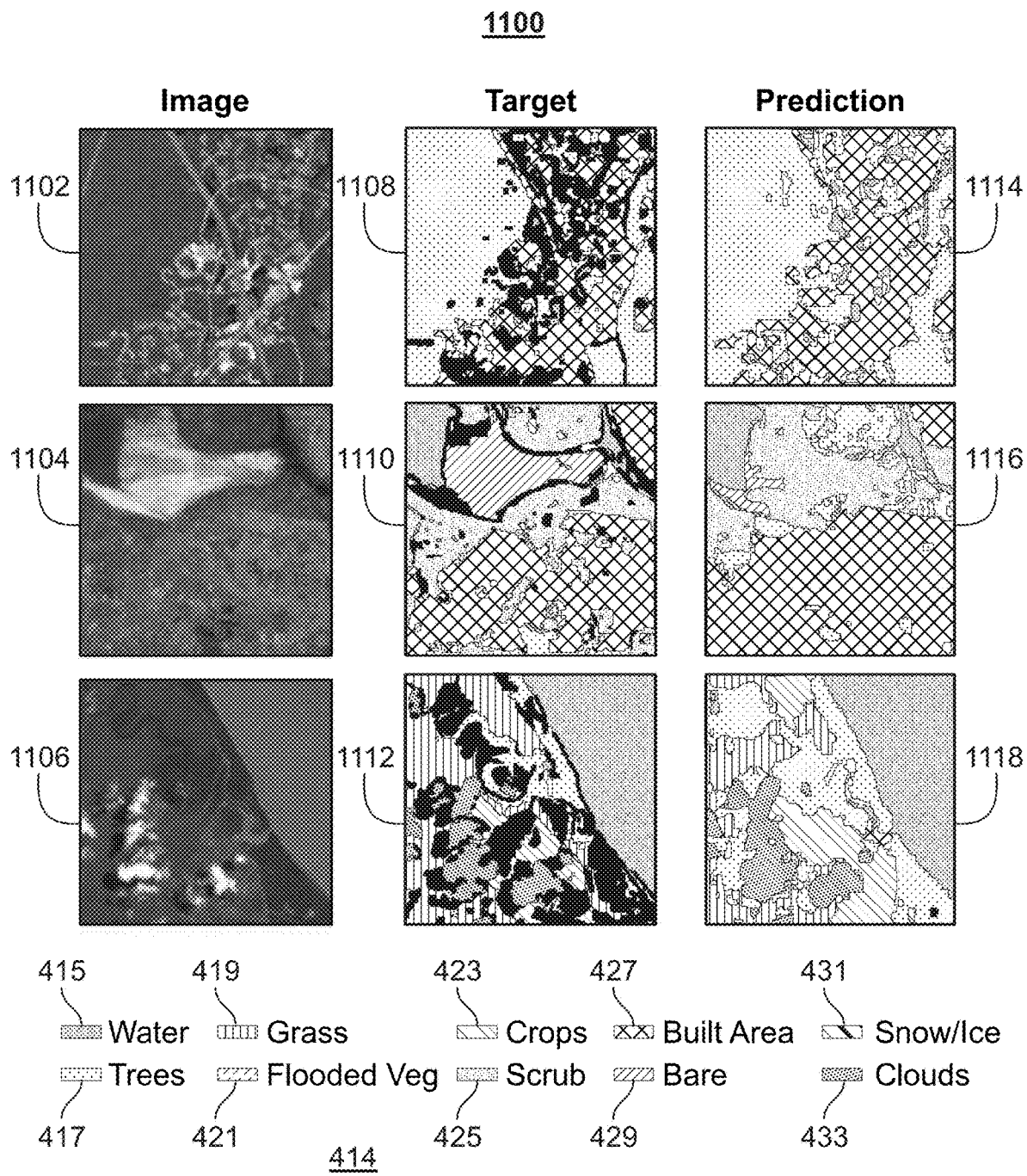
FIG. 11 shows illustrative captured overhead images, labeled versions of the captured images, and predictions of mapping categories of the captured images as output by a trained machine learning model to categorize each pixel of an input overhead image, in accordance with some embodiments of this disclosure.

FIG. 11 shows illustrative captured overhead images, labeled versions of the captured images, and predictions of mapping categories of the captured images as output by a trained machine learning model to categorize each pixel of an input overhead image, in accordance with some embodiments of this disclosure. For example, overhead images 1102, 1104, 1106 (e.g., captured by aircraft 102), may correspond to labeled images 1108, 1110, 1112, respectively, where each particular mapping category indicated in labeled images 1108, 1110, 1112 may be represented by one of the particular colors (or other suitable indicators) indicated in legend 1120 (or other distinguishing characteristic, or any combination thereof). Images 1114, 1116, 1118 represent predictions by trained model 1005 of respective mapping categories for pixels of images 1102, 1104 and 1106. For example, FIG. 11 shows a side-by-side comparison of images 1114, 1116, 1118 output by model 1005 and images 1102, 1104, 1106 as labeled by human editors (e.g., images 1108, 1110, 1112 may not be input to the model and may be utilized in the example for comparison purposes to the predicted mapping categories of pixels of images 1114, 1116, 1118). In some embodiments, unlabeled pixels (e.g., pixels 1122) may be predicted and filled in by trained model 1005, e.g., to provide a fuller representation than is provided in certain training data.

Figure 12:
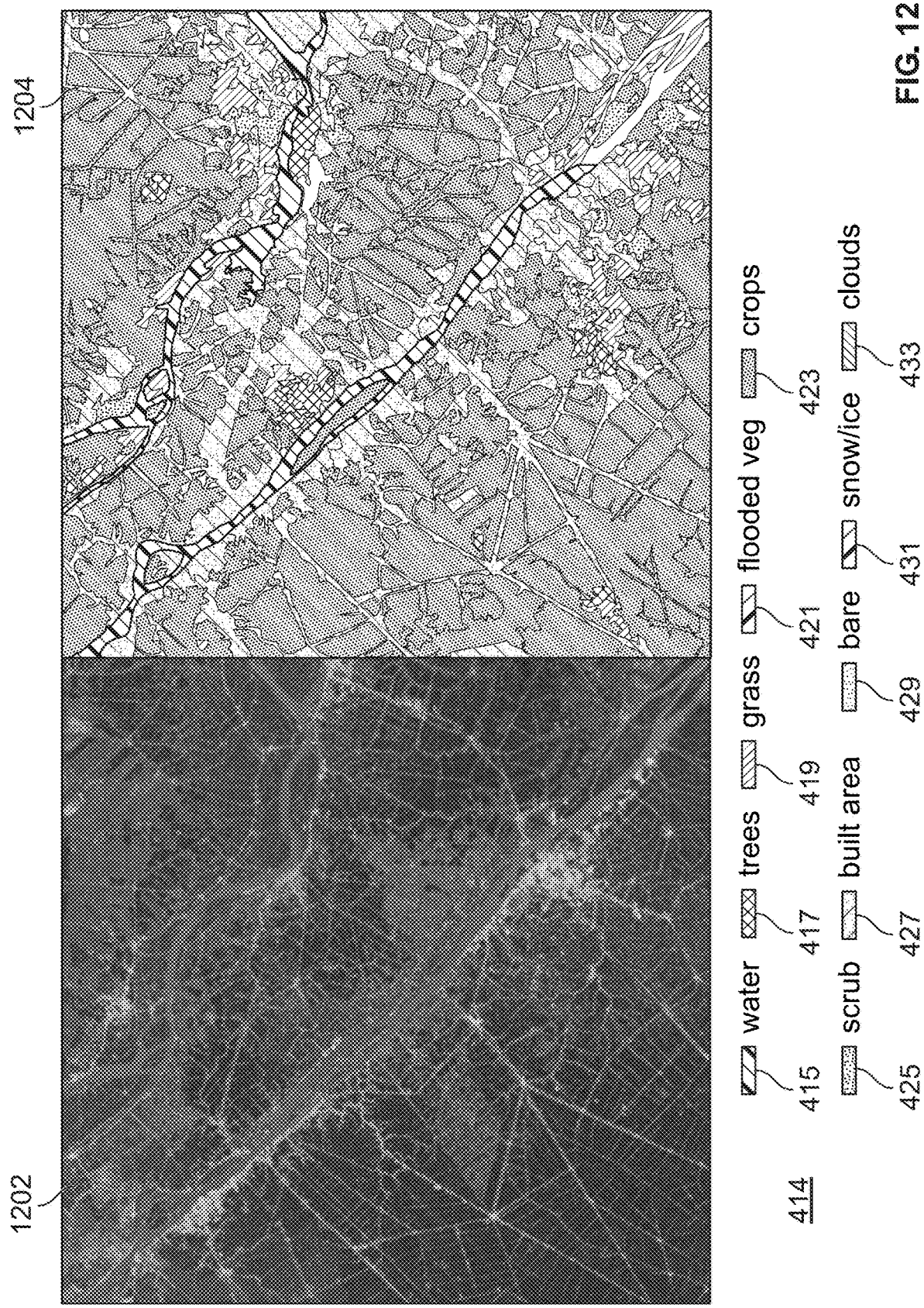
FIG. 12 shows an illustrative captured overhead image and a prediction of mapping categories output by a trained machine learning model to categorize each pixel of an input overhead image, in accordance with some embodiments of this disclosure.

FIG. 12 shows an illustrative captured overhead image and a prediction of mapping categories output by a trained machine learning model to categorize each pixel of an input overhead image 1202, in accordance with some embodiments of this disclosure. As shown in FIG. 12, image 1204, e.g., output by trained machine learning model 1005, may comprise a plurality of colors or other indications of which mapping category of a plurality of mapping category to which pixels of image 1204 belong (e.g., as indicated at legend 414). Model 1005 is able to capture small villages (e.g., the "built area" mapping category depicted in red) and canals in an otherwise largely agricultural landscape (e.g., indicated by an orange color, or another suitable indicator, for the "crops" mapping category).

The mapping system may employ various techniques to leverage trained machine learning model 1005 over geographic areas of interest, e.g., desired regions of the earth, over a predefined period of time (e.g., incorporating relevant data across an entire year or other desired period of time). For example, the mapping system may deploy the model on a composite image, e.g., to generate a composite image comprising image data captured over the entire predefined period of time, and such generated composite image may be input into model 1005, to yield classifications which may be representative of the time frame. As another example, the mapping system may generate a composite of classifications. For example, the mapping system may individually input to the machine learning model images captured over the predefined period of time, e.g., so that the model is being provided image data matching the type of data it may be trained on. For example, the model may be run on multiple individual scenes from multiple points in time, and the mapping system may composite the results of the classification.

In some embodiments, the mapping system may analyze composite images or maps from previous years matching the specific time of year requested for a new composite image or map to be generated. For example, if a requested time period for the composite image is spring of 2022, the mapping system may take into account a particular mapping category that is determined most frequently (or most confidently) in spring of 2021 for the geographic area (and/or for spring of any other suitable year(s)) when generating the composite image. In some embodiments, For each respective pixel of the composite image, the processing circuitry may cause the pixel to be represented as being of the same particular mapping category that is identified for the pixel of the plurality of overhead images that corresponds to the pixel of the composite image.

Figure 13:
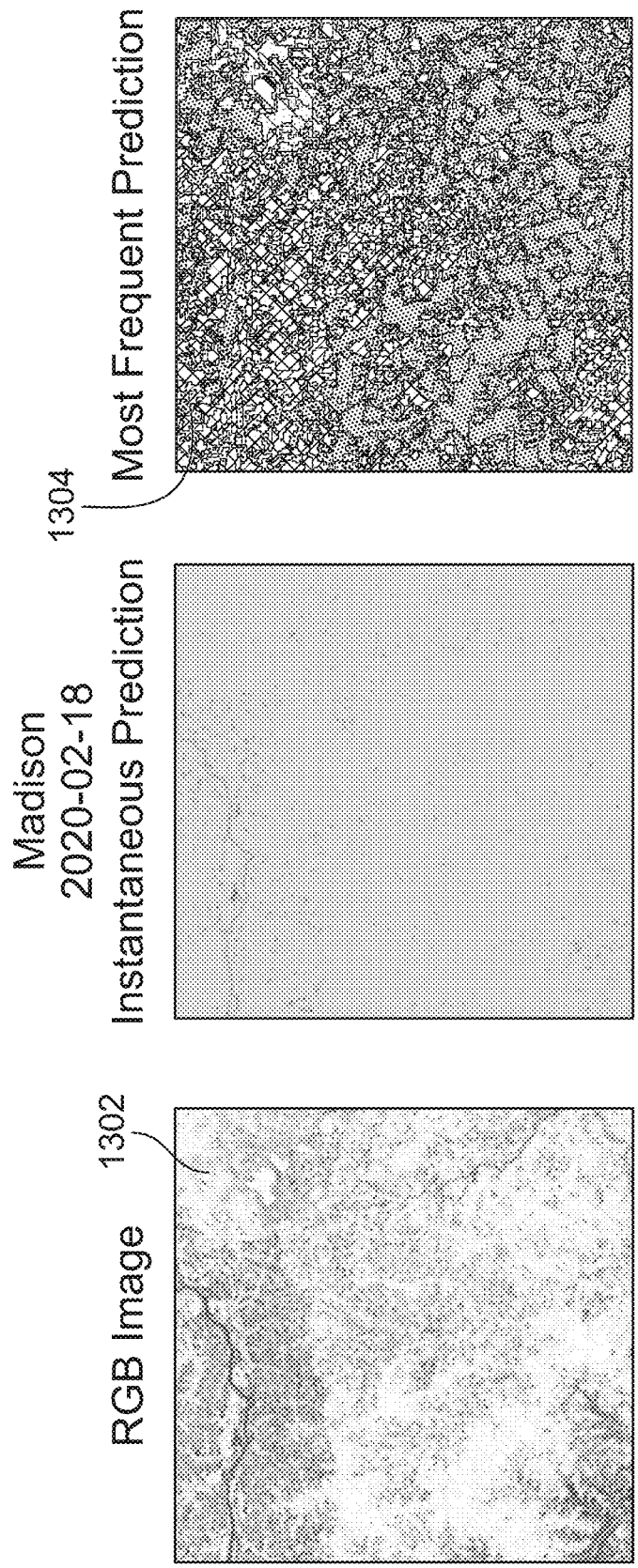
FIG. 13 depicts an illustrative straight mode technique employed on a series of images, in accordance with some embodiments of this disclosure.

As shown in FIG. 13, in some embodiments, the mapping system may employ a straight mode technique in which the mapping category determined most frequently by trained machine learning model 1005 may be identified, e.g., by way of a pixel-wise mode operation over a plurality of overhead images of the same geographic area. FIG. 13 depicts an illustrative image 1302 resulting from the straight mode technique being utilized over multiple images (e.g., including image 1302) captured in a geographic vicinity of Madison, Wisconsin. The mapping system may generate a composite image based on the straight mode technique by identifying, for each pixel of the plurality of overhead images of the particular geographic area, a particular mapping category that is determined most frequently 1304 by the trained machine learning model over the time period. Additionally or alternatively, the mapping system may generate a composite image based at least in part on identifying, for each pixel of the plurality of overhead images of the particular geographic area, a particular mapping category associated with the highest confidence score, as output by the trained machine learning model, over such time period. For each respective pixel of the composite image, the mapping system may cause the pixel to be represented as being of the same particular mapping category that is identified for the pixel of the plurality of overhead images that corresponds to the pixel of the composite image.

In some embodiments, the mapping system may employ a class weighted mode technique, which may comprise an algorithmic formulation for generating a composite of classifications, suitable for large-scale deployment. The mapping system may employ the class weighted mode technique, which may leverage the observation that some mapping categories may be under-represented by the model, e.g., grass, flooded vegetation, bare ground, forest, built area, scrubland, grassland, and/or rangeland, which may also change in appearance seasonally (e.g., grass may be green or brown depending on how much rain a region recently received), and thus it may be desirable to weight such classes higher when generating a map (e.g., even if grass isn't the most frequently observed class for a particular pixel, it may be desirable to classify such pixel as grass). As discussed herein, the mapping system may cause weights to be set during training (e.g., sample weights) such that each mapping category (or one or more of the mapping categories) may be set to a different weight (e.g., determined based on the distribution of pixels across mapping categories in the original training dataset, or any other suitable technique, or any combination thereof), and a similar technique may be utilized in formulating the class weighted mode. For example, in the class weighted mode, the mapping system may combine (e.g., multiply or otherwise combine) respective probabilities associated with each mapping category with the desired weights for particular mapping categories (as compared to other mapping categories), in a pixel-wise manner, to weight the mode computation. For example, the mapping system may cause certain classes (e.g., grass and flooded vegetation, and/or forest, built area, scrubland, grassland, and/or rangeland) to be heavily weighted whereas other classes (e.g., crops and bare grounds) may be assigned relatively lower weights, while other classes (e.g., snow/ice and clouds) may be weighted even lower (e.g., to minimize predictions for such mapping categories unless such categories are persistently identified over time). In some embodiments, the mapping system may cause the class weighted mode to utilize raw probability data (e.g., prior to a softmax or argmax computation) in performing weighting of mode classifications. In some embodiments, mode weighted by specific weights per class may formulate a custom class weight, multiply probabilities by class weights, and compute the weighted mode. In some embodiments, alternative or in addition to taking into account the respective probabilities associated with each mapping category, the class weighted mode may take into account a likelihood with respect to a particular mapping category, and/or confidence score with respect to a particular mapping category, and/or a degree of similarity to one or more pixels of one or more of the training overhead images.

In some embodiments, the mapping system may specify, during a temporal compositing of the model outputs, a weight per class, which may take into account a seasonal adjustment. For example, the mapping system may weight a mapping category for grass higher because it is highly seasonal and may only show up a few times per year. Based on gained knowledge and observations of how certain classes appear throughout the course of the year, as well as less-represented classes in the training dataset, the mapping system may assign weights to each class for use in the class weighted mode computation. In some embodiments, particular geographic regions or ecoregions may be assigned separate weights or tuned differently. For example, the mapping system may assign separate weights to the continent of Africa (or any other suitable cot intent or region, or any combination thereof) compared to the rest of the world, in particular to increase sensitivity to the types of smallholder agriculture unique to the region, and/or ecologically homogenous spatial regions may be similarly weighted or biased (e.g., in one or more of the machine learning model and/or temporal compositing of images).

Figure 14:
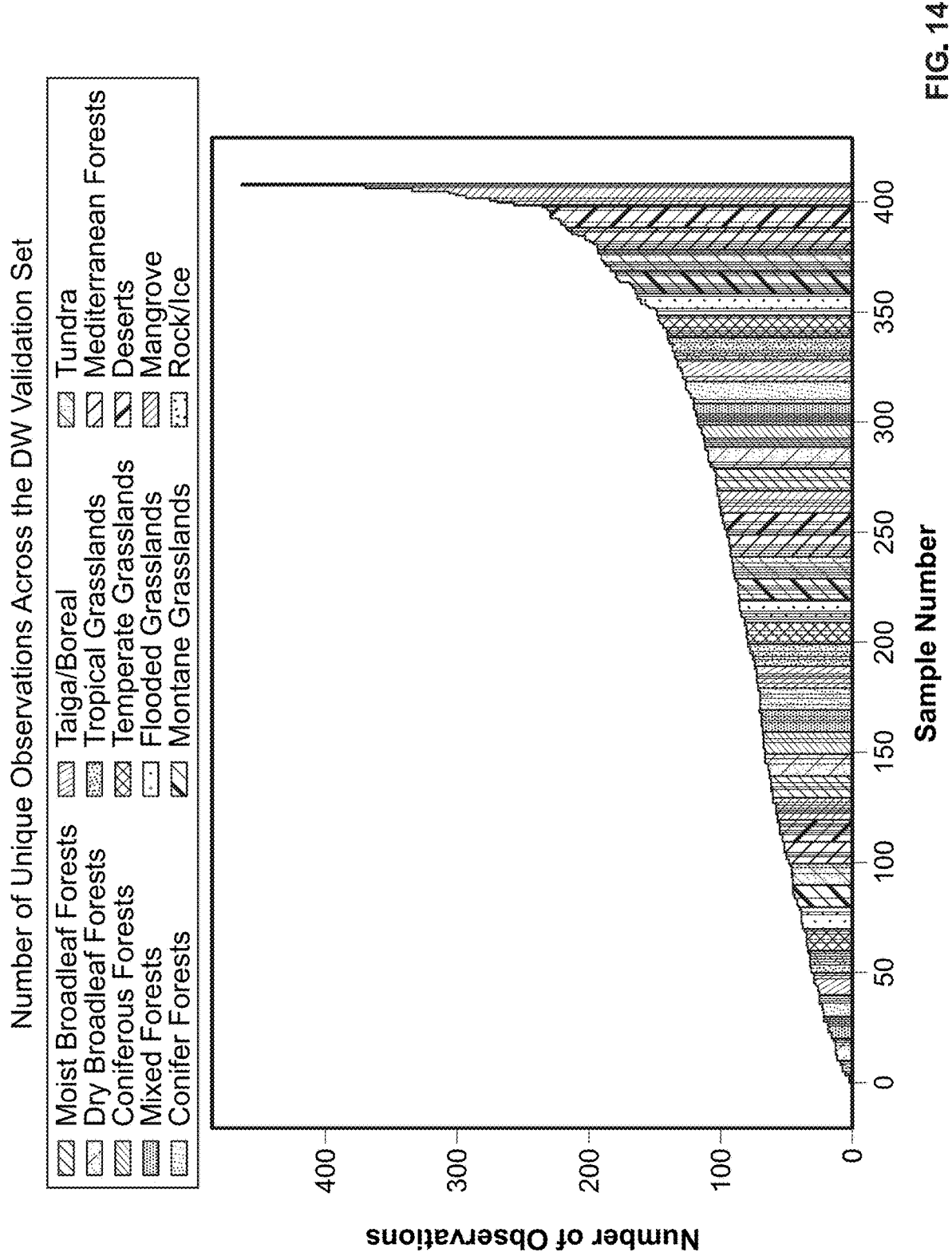
FIG. 14 depicts an illustrative evaluation of the performance of a class weighted mode on a validation set, in accordance with some embodiments of this disclosure.

FIG. 14 depicts an illustrative evaluation of the performance of a class weighted mode on a validation dataset, in accordance with some embodiments of this disclosure. For each validation tile, the mapping system may utilize cloud-filtered data (or any other suitable type of data, or any combination thereof) within a predefined range of a timestamp of each image (e.g., six months prior to, and subsequent to, the time stamp to obtain a year's worth of image data for each validation tile). In some embodiments, the number of images retrieved by way of the mapping system via the cloud-filtered data may depend on how cloudy a particular region is (e.g., many hundreds of images may be captured and input to the model over a predefined period of time if a particular region is determined to be cloudy, whereas significantly less images may be utilized in a less cloddy region). For example, for the 12 months of data which may correspond to each validation tile, the model may output predictions of mapping categories for each respective pixel, and the mapping system may compute the class weighted mode across each of such predictions. In some embodiments, confusion matrices may be generated to measure the performance of the model when the class weighted mode is utilized, and certain mapping categories (e.g., snow/ice and clouds, or any other suitable mapping category, or any combination thereof) having been dis-incentivized based on weights assigned to such categories may not be included within the accuracy computations. FIG. 14 depicts a graph representing a number of unique observations per tile across the validation set, which may vary depending on biome and geography (e.g., based on how cloudy and/or tropical a particular region is).

Each validation tile may represent an image (and corresponding mapping category) at a single instance in time. The model may be deployed over a series of images captured across a year and then combined together, and the same approach may be used in validation so that the results are representative of the global map. For each validation timestamp, overhead imagery from the entire year, which may be processed by the mapping system (e.g., filtered by cloud cover to remove images depicting a clouds in at least a predetermined threshold amount of pixels) may be input to the model over the resulting imagery for each validation tile, and the mapping system may compute a class weighted mode across the model results. In some embodiments, the mapping system may utilize scene selection logic and a class weighted mode matching the logic used in deploying the global model.

In some embodiments, such temporal composite of model outputs allows emphasis of certain classes over others, and also provides the model with robustness to cloud cover and seasonal snowfall. However, this may make accuracy comparison for these classes challenging within the validation formulation. For example, if there were clouds during a validation scene, the mapping system may cause the temporal composite to remove the cloud cover by aggregating data from other scenes in the years, and for seasonal snowfall, the model may only report persistent snow cover (e.g. glaciers, permanent snowpack). In some embodiments, snow and clouds (or any other suitable classes, or any combination thereof) in the global map may be excluded from the accuracy calculation. From the output of the class weighted mode per validation tile, the mapping system may compute an overall accuracy percentage by counting the number of correct pixel classifications across all classes and dividing by the total number of available pixels. Similarly, the mapping system may compute a confusion matrix, which may show the accuracy and confusers per class, as discussed in connection with FIG. 9.

FIGS. 15A-15B show illustrative resulting images when a machine learning model is deployed along with a class weighted mode, in accordance with some embodiments of this disclosure. The mapping system may cause image 1502 of FIG. 15A to be input to machine learning model 1005. Image 1504 may reflect human editor markup of various mapping categories. Image 1506, output from model 1005 and to which the class weighted mode is applied, may indicate more nuanced mapping category identifications than image 1504 (e.g., mapping category 1505, corresponding to scrub, category 1501, category 1503, or any other suitable category or any combination thereof, of image 1506). In some embodiments, such nuanced mapping category may differentiate between mapping category regions (e.g., teasing out different vegetation types, distinguishing between water and flooded vegetation, distinguishing between urban areas and bare ground, or any other suitable differentiations, or any combination thereof).

FIG. 15B shows captured optical image 1508 which may be input to machine learning model 1005. Image 1510 may reflect human editor markup of various mapping categories. Image 1512, output from model 1005 and to which the class weighted mode is applied, may predict or infer portions 1507 that are unlabeled in image 1510, and may clearly differentiate between mapping category regions (e.g., trees 1509, grass 1511, crops 1413).

Figure 16:
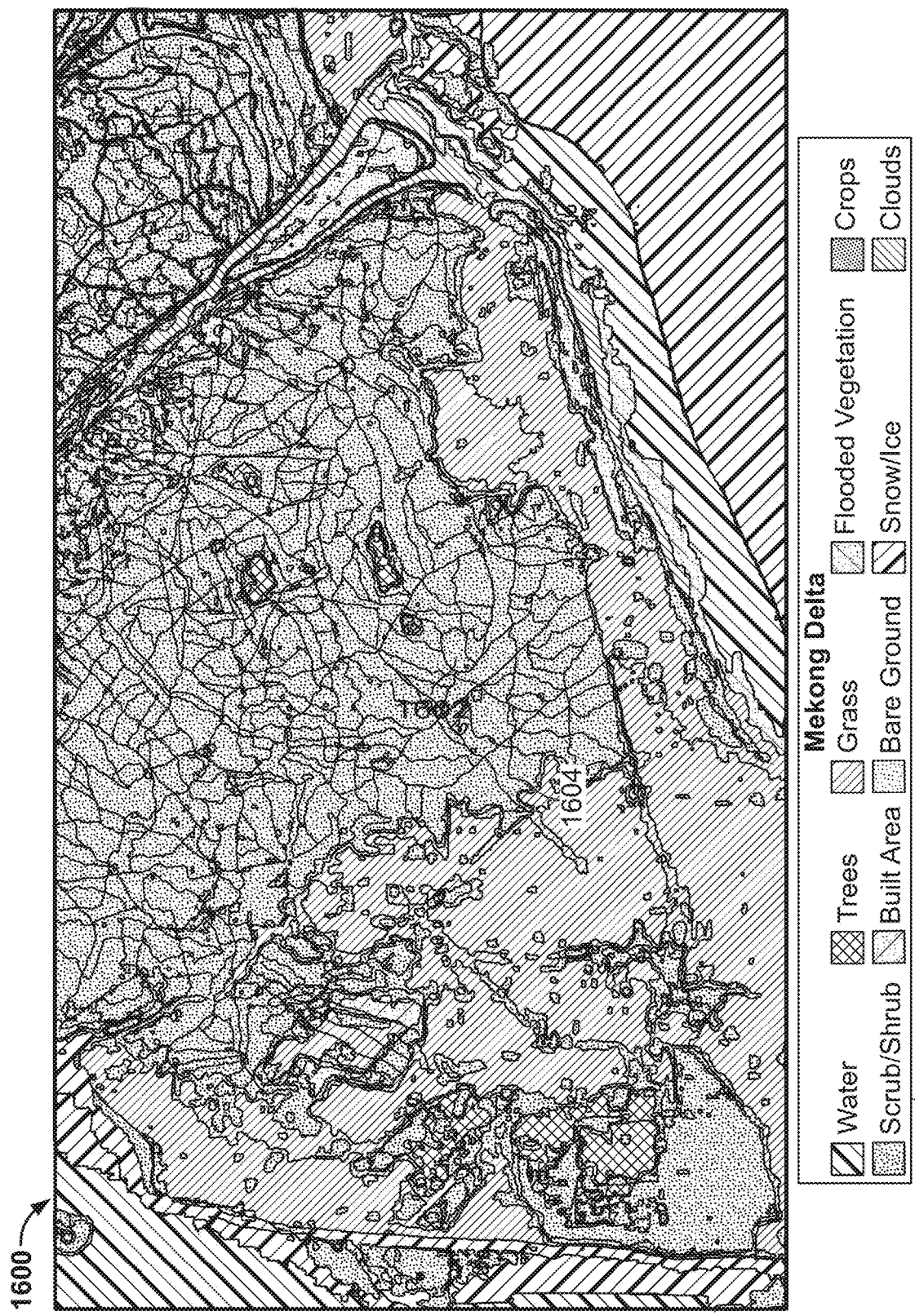
FIG. 16 shows an illustrative map of a geographic area associated with a plurality of overhead images generated based on the plurality of overhead images and on categories determined by a machine learning model, in accordance with some embodiments of this disclosure.

FIG. 16 shows an illustrative map 1600 of a geographic area associated with a plurality of overhead images generated based on the plurality of overhead images and on categories determined by a machine learning model, in accordance with some embodiments of this disclosure. Map 1600 depicts the Mekong River Delta in Southern Vietnam at a resolution of 10 meters per pixel. The mapping system may generate map 1600 based on mapping category predictions or classifications or inferences output by machine learning model 1005 for each pixel of a plurality of overhead training images input to model 1005, and using one or more of the aforementioned techniques (e.g., the class weighted mode or any other suitable technique or any combination thereof) to composite together images of the particular region captured over a predefined period of time (e.g., one year). Legend 1602 indicates the correspondence between certain colors (or other indicators) depicted in map 1600 and mapping categories (e.g., an orange color, or another suitable indicator, represents the mapping category crops, a red color, or another suitable indicator, represents the mapping category built area, etc.). Map 1600 may comprise dense lines of indicative of the mapping category "built area," such as depicted at 1604, e.g., villages built along roads and irrigation canals. Central and northern areas are dominated by rice paddies, while the water further south represents aquaculture ponds. In some embodiments, a display (e.g., display 235 of FIG. 2) presenting map 1600 may include a temporal axis (e.g., a slider option selectable to toggle between various times of the year during which the plurality of images of the area of interest (e.g., arbitrarily large) were captured, to cause the display to depict mapping categories corresponding to the selected time period). In some embodiments, the output map generated by the mapping system may highlight features previously unseen in global land cover maps, e.g., meandering streams, rural villages, and pockets of permanent snowfields.

In some embodiments, the model may be trained to recognize biome-specific characteristics, which may differ in particular geographic areas (e.g., grass may look brown in New Mexico, but brighter in Ireland, or any other suitable characteristics, or any combination thereof). In some embodiments, the mapping system may train biome-specific models to recognize such characteristics in particular geographic areas. Additionally or alternatively, data from multiple time points may be used to generate a change detection algorithms (e.g., to determine a time point within multiple overhead images when a significant change occurred regarding mapping categories predicted in a particular region). In some embodiments, the mapping system may input captured overhead images (e.g., Sentinel-2 imagery or any other suitable imagery or any combination thereof) to trained machine learning model 124 annually (or at any other suitable time interval), to provide up-to-date global mapping information.

Figure 17:
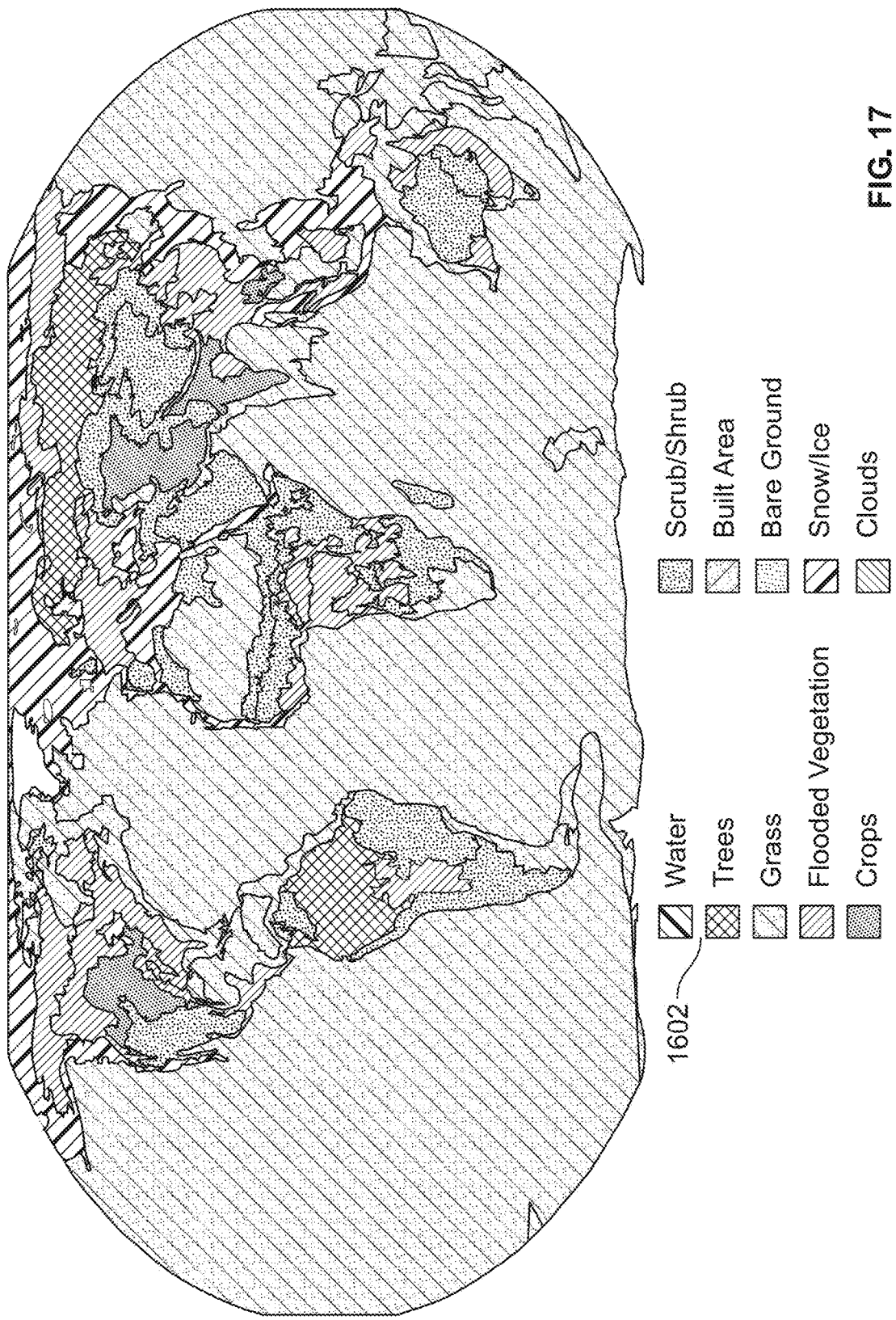
FIG. 17 shows an illustrative map of a geographic area associated with a plurality of overhead images generated based on the plurality of overhead images and on categories determined by a machine learning model, in accordance with some embodiments of this disclosure.

FIG. 17 shows an illustrative map 1700 of a geographic area associated with a plurality of overhead images generated based on the plurality of overhead images and on categories determined by a machine learning model, in accordance with some embodiments of this disclosure. Map 1700 is a global map depicting planet earth. Map 1700 may be generated by the mapping system based on mapping category predictions or classifications output by machine learning model 1005 for each pixel of a plurality of overhead training images input to model 1005, and using one or more of the aforementioned techniques (e.g., the class weighted mode or any other suitable technique of any combination thereof) to composite together images of each region of earth captured over a predefined period of time (e.g., one year). Legend 1702 indicates the correspondence between certain colors (or other suitable indicators) depicted in map 1600 and mapping categories (e.g., an orange color, or another suitable indicator, represents the mapping category crops, a red color, or another suitable indicator, represents the mapping category built area).

Figure 18:
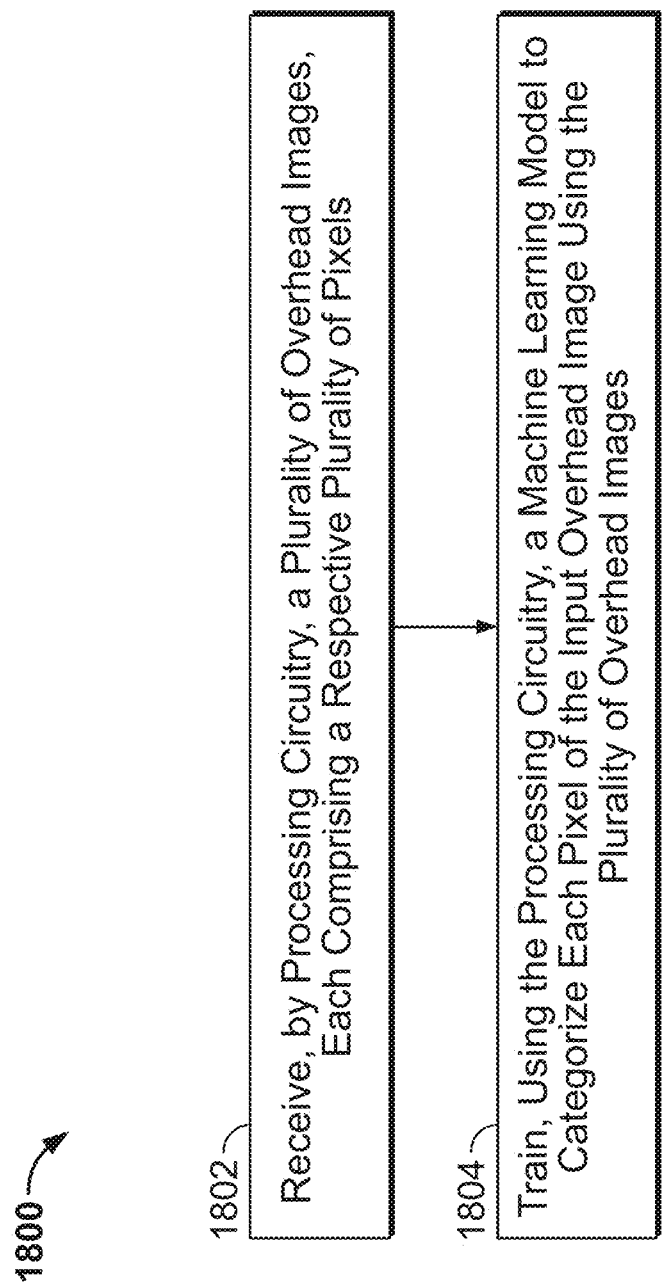
FIG. 18 is a flowchart of a detailed illustrative process for training a machine learning model, in accordance with some embodiments of this disclosure.

FIG. 18 is a flowchart of a detailed illustrative process 1800 for training a machine learning model, in accordance with some embodiments of this disclosure. In various embodiments, the individual steps of process 1800 may be implemented by one or more components of the devices and systems discussed in FIGS. 1-17. Although the present disclosure may describe certain steps of process 1800 (and of other processes described herein) as being implemented by certain components of the devices and systems of FIGS. 1-17, this is for purposes of illustration only, and it should be understood that other components of the devices and systems of FIGS. 1-17 may implement those steps instead. In addition, one or more steps of process 1800 may be incorporated into or combined with one or more steps of any other process or embodiment (e.g., FIG. 19 or FIG. 20 or FIG. 21 or FIG. 22, or any other embodiment disclosed herein, or any combination thereof).

At 1802, the mapping system receives a plurality of overhead images (e.g., images 110, 112, 114, 116, 118 captured at 106 of FIG. 1). Each received image may comprise a respective plurality of pixels. In some embodiments, each pixel of each image may be designated (e.g, at 108 of FIG. 1) as being of a particular mapping category of a plurality of mapping categories (e.g., clouds, snow/ice, grass, trees, cropland, built area, bare ground, flooded vegetation, water, or scrub/shrub). In some embodiments, the designation may be based on using boundary information to indicate where boundaries between regions of pixels of different categories are located, e.g., the overhead image may be annotated to comprise an indication of the boundary information (e.g., a dense labeling of pixels and neighboring pixels).

At 1804, the mapping system may train a machine learning model (e.g., model 305 of FIG. 3) to categorize each pixel of an input overhead image using the plurality of overhead images received at 1802. In some embodiments, model 305 may comprise a convolutional neural network, which may comprise one or more of input layer 307, hidden layer 309 and output layer 311. The machine learning model may categorize each pixel by outputting respective probabilities for each particular mapping category, and the mapping category having the highest probability may correspond to the categorization. It should be appreciated that any suitable number of training images may be utilized to train the machine learning model. For example, the training data for use comprise training overhead images of a predefined dimensioned area of the planet (e.g., 24,000 5 km×5 km images or 100 km×100 km images collectively comprising over 5 billion human-labeled pixels, where each image may each be 510×510 pixel RGB natural-color images).

Figure 19:
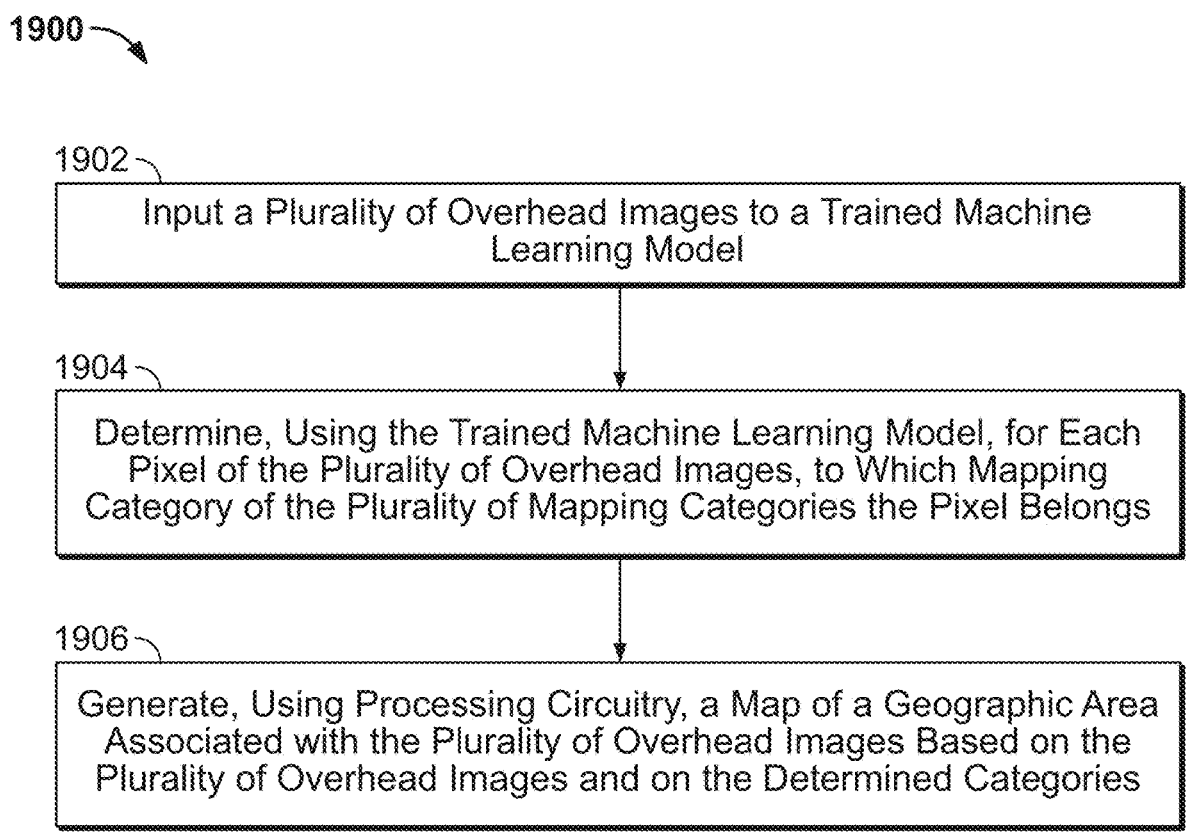
FIG. 19 is a flowchart of a detailed illustrative process for generating a map of a geographic area, in accordance with some embodiments of this disclosure.

FIG. 19 is a flowchart of a detailed illustrative process 1900 for generating a map of a geographic area, in accordance with some embodiments of this disclosure. In various embodiments, the individual steps of process 1900 may be implemented by one or more components of the devices and systems discussed in FIGS. 1-16. Although the present disclosure may describe certain steps of process 1900 (and of other processes described herein) as being implemented by certain components of the devices and systems of FIGS. 1-16, this is for purposes of illustration only, and it should be understood that other components of the devices and systems of FIGS. 1-17 may implement those steps instead. In addition, one or more steps of process 1900 may be incorporated into or combined with one or more steps of any other process or embodiment (e.g., FIG. 18 or FIG. 20 or FIG. 21 or FIG. 22, or any other embodiment disclosed herein, or any combination thereof).

At 1902, the mapping system may input a plurality of overhead images (e.g., images 110, 112, 114, 116, 118 captured at 106 of FIG. 1) to a trained machine learning model (e.g., model 1005 of FIG. 11). In some embodiments, the machine learning model may be trained by receiving a plurality of training overhead images, each comprising a respective plurality of pixels, each pixel of each training overhead image of the plurality of training overhead images designated as being of a particular mapping category of a plurality of mapping categories, and training the machine learning model to categorize each pixel of an input overhead image using the plurality of training overhead images, in a similar manner as discussed in connection with FIG. 18.

At 1904, the mapping system may determine, using the trained machine learning model (e.g., model 1005 of FIG. 11) for each pixel of the plurality of overhead images (e.g., images 1102, 1104, 1106 of FIG. 11), to which mapping category of the plurality of mapping categories the pixel belongs (e.g., as depicted by the colors, or other suitable indicators, in images 1114, 1116, 1118 which represent respective mapping categories).

At 1906, the mapping system may generate a map of a geographic area (e.g., a global map as shown in FIG. 17, or a portion thereof, such as the Mekong River Delta in Southern Vietnam as shown in FIG. 16) based on the plurality of overhead images and on the determined categories. In some embodiments, for each overhead image input to the machine learning model, the machine learning model may output a map (e.g., image 1204 of FIG. 12) comprising indications of a mapping category for each pixel for a particular geographic region.

For each geographic region (e.g., spanning the globe), a plurality of images from various times over the course of, e.g., one year or any other suitable time period, may be respectively input to the machine learning model, and for each geographic region, one or more of a variety of techniques (e.g., a straight mode and/or a class weighted mode, as discussed above) may be utilized to composite together a plurality of maps output for each geographic region (e.g., to obtain a single map for each region reflecting the mapping categories that best classify each pixel representing portions of the region). The resulting map for each region may then be composited or stitched together to form a global map (e.g., map 1700 of FIG. 17).

Figure 20:
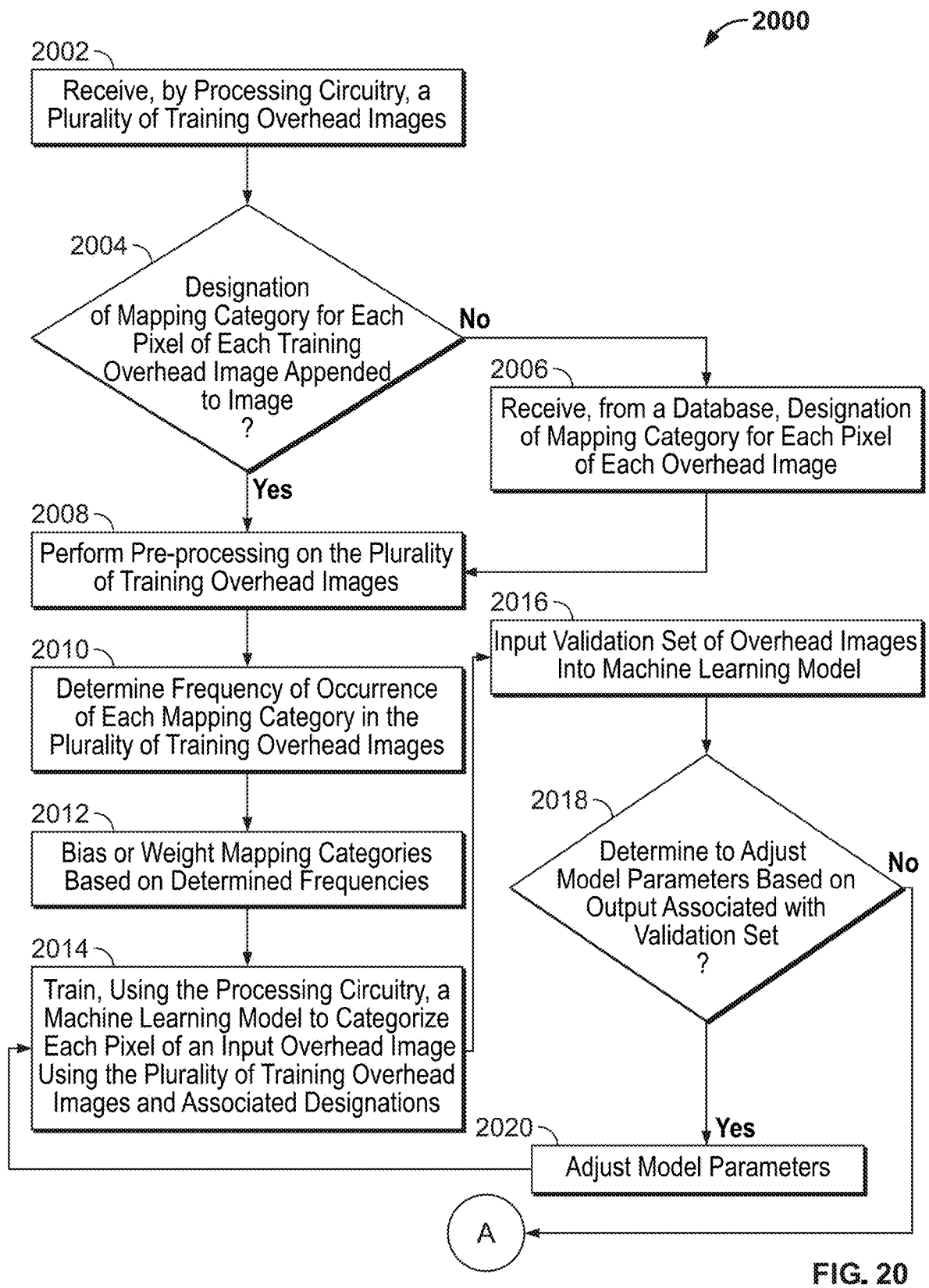
FIG. 20 is a flowchart of a detailed illustrative process for training a machine learning model, in accordance with some embodiments of this disclosure.

FIG. 20 is a flowchart of a detailed illustrative process 2000 for generating a map of a geographic area, in accordance with some embodiments of this disclosure. In various embodiments, the individual steps of process 2000 may be implemented by one or more components of the devices and systems discussed in FIGS. 1-16. Although the present disclosure may describe certain steps of process 2000 (and of other processes described herein) as being implemented by certain components of the devices and systems of FIGS. 1-16, this is for purposes of illustration only, and it should be understood that other components of the devices and systems of FIGS. 1-17 may implement those steps instead. In addition, one or more steps of process 2000 may be incorporated into or combined with one or more steps of any other process or embodiment (e.g., FIG. 18 or FIG. 19 or FIG. 21 or FIG. 22, or any other embodiment disclosed herein, or any combination thereof).

At 2002, the mapping system may capture or otherwise receive a plurality of training overhead images. 2002 may be performed in a similar manner as 1802.

At 2004, the mapping system may determine, e.g., by analyzing an image file associated with each training overhead image, whether a designation of a mapping category for each pixel of each training overhead image is appended to the received training overhead image. If each pixel is associated with a designation, processing may proceed to 2008. If at least one pixel is not associated with a designation, processing may proceed to 2006.

At 2004, the mapping system may access information associated with the one or more images (and associated pixels thereof) to which respective mapping categories are not appended. Upon receiving the requested mapping category designations, processing may proceed to 2008.

At 2008, the mapping system may optionally perform one or more pre-processing techniques on the plurality of training overhead images. For example a class weight for unlabeled pixels (i.e., no data) may be zeroed out, thereby forcing model 305 to ignore unlabeled regions in overhead training images during training.

At 2010, the mapping system may determine a frequency of occurrence of each mapping category in the plurality of overhead images. In some embodiments, based on the determined frequencies, the mapping system may, at 2012, perform weighting or biasing of certain mapping categories. For example, certain mapping categories (e.g., under-represented in the training set) may be assigned relatively higher weights or biases, whereas other mapping categories (e.g., having a high frequency in the training set) may be assigned relatively lower weights or biases.

At 2014, the mapping system may train a machine learning model (e.g., model 305 of FIG. 3) to categorize each pixel of an input overhead image using the plurality of training overhead images and associated designations. 2014 may be performed in a similar manner as 1804.

At 2016, once the model is trained and/or during the training process, the mapping system may input a validation set (e.g, corresponding to the validation set having the characteristics shown in FIGS. 7-8) into the machine learning model (e.g., model 1005 of FIG. 10).

At 2018, the mapping system may analyze the results (e.g., by generating a confusion matrix, such as shown in FIG. 9) of the validation set. For example, the mapping system may compare the accuracy of the validation set to the accuracy of a test set or the training set, to determine, at 2018, whether it is desirable to further tune parameters the model (e.g., hyperparameters of the model).

Processing may proceed to 2020 in response to a determination at 2018 by the mapping system that it may be desirable to adjust model parameters (e.g., weights and/or biases or hyperparameters of the model), and any suitable modifications may be performed to the model. In some embodiments, processing may proceed to A (FIG. 21) if the mapping system determines that the model is determined to performing well and no further tuning is needed.

Figure 21:
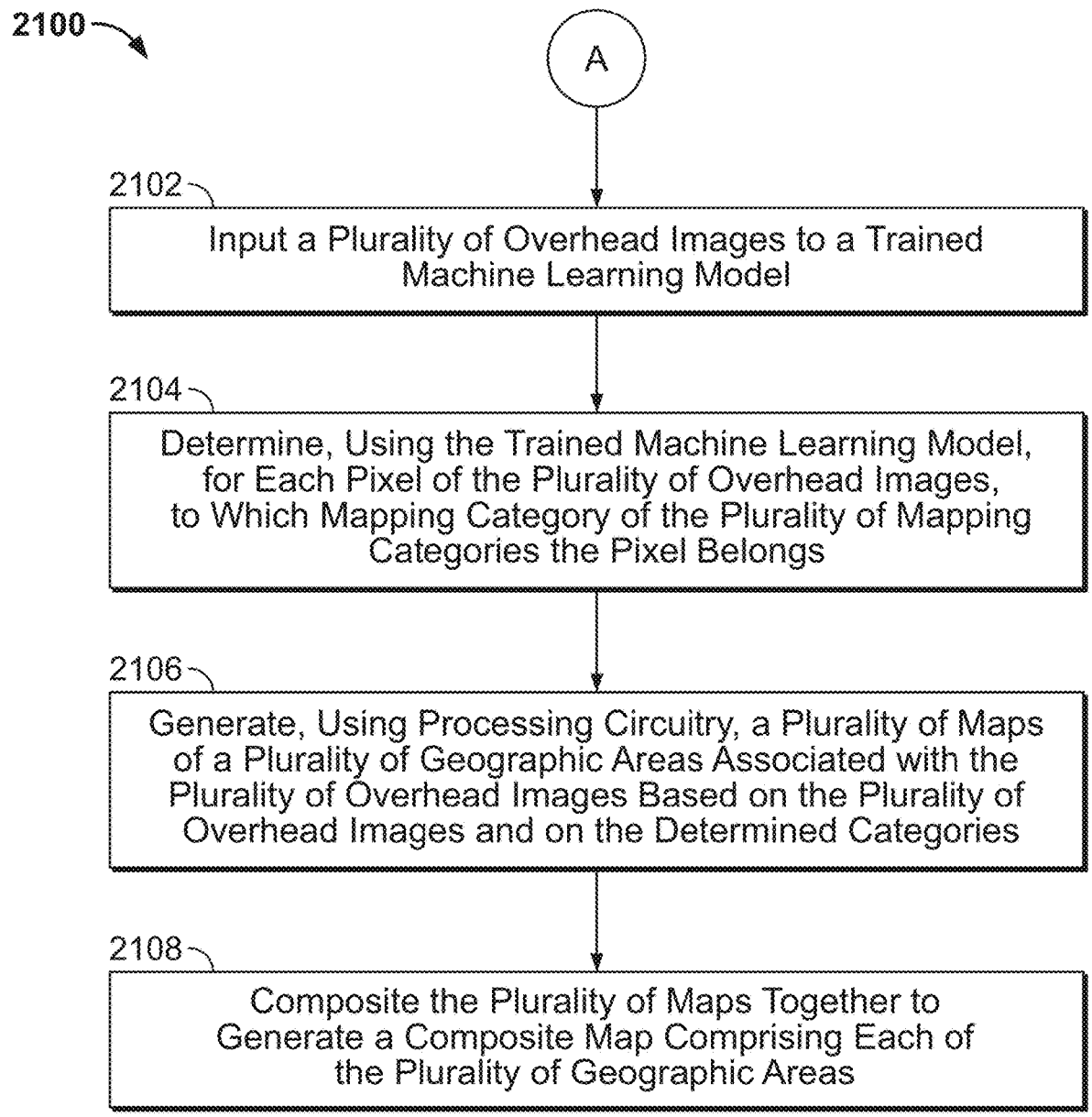
FIG. 21 is a flowchart of a detailed illustrative process for generating a map of a geographic area, in accordance with some embodiments of this disclosure.

FIG. 21 is a flowchart of a detailed illustrative process 2100 for generating a map of a geographic area, in accordance with some embodiments of this disclosure. In various embodiments, the individual steps of process 2100 may be implemented by one or more components of the devices and systems discussed in FIGS. 1-16. Although the present disclosure may describe certain steps of process 2100 (and of other processes described herein) as being implemented by certain components of the devices and systems of FIGS. 1-16, this is for purposes of illustration only, and it should be understood that other components of the devices and systems of FIGS. 1-17 may implement those steps instead. In addition, one or more steps of process 2100 may be incorporated into or combined with one or more steps of any other process or embodiment (e.g., FIG. 18 or FIG. 19 or FIG. 20 or FIG. 22, or any other embodiment disclosed herein, or any combination thereof).

At 2102, the mapping system may input a plurality of overhead images to a trained machine learning model (e.g., model 1005 of FIG. 10). 2102 may be performed in a similar manner as 1902 of FIG. 19.

At 2104, the mapping system may determine, using the trained machine learning model, for each pixel of the plurality of overhead images, to which mapping category of the plurality of mapping categories the pixel belongs. 2104 may be performed in a similar manner as 1904 of FIG. 19.

At 2106, the mapping system may generate a plurality of maps (e.g., multiple maps for a particular geographic area, such as the Mekong River Delta in Southern Vietnam, shown in FIG. 16) of a plurality of geographic areas (e.g., spanning the world) associated with the plurality of overhead images (e.g., input at 126 of FIG. 1) based on the plurality of overhead images and on the determined mapping categories.

At 2108, the mapping system may composite the plurality of maps together to generate a composite map (e.g., a global map) comprising each of the plurality of geographic areas. For example, one or more of a variety of techniques (e.g., a straight mode and/or a class weighted mode, as discussed above) may be utilized to composite together a plurality of maps output for each geographic region (e.g., to obtain a single map for each region reflecting the mapping categories that best classify each pixel representing portions of the region). The resulting maps for each region may then be composited or stitched together to form a global map (e.g., map 1700 of FIG. 17).

Figure 22:
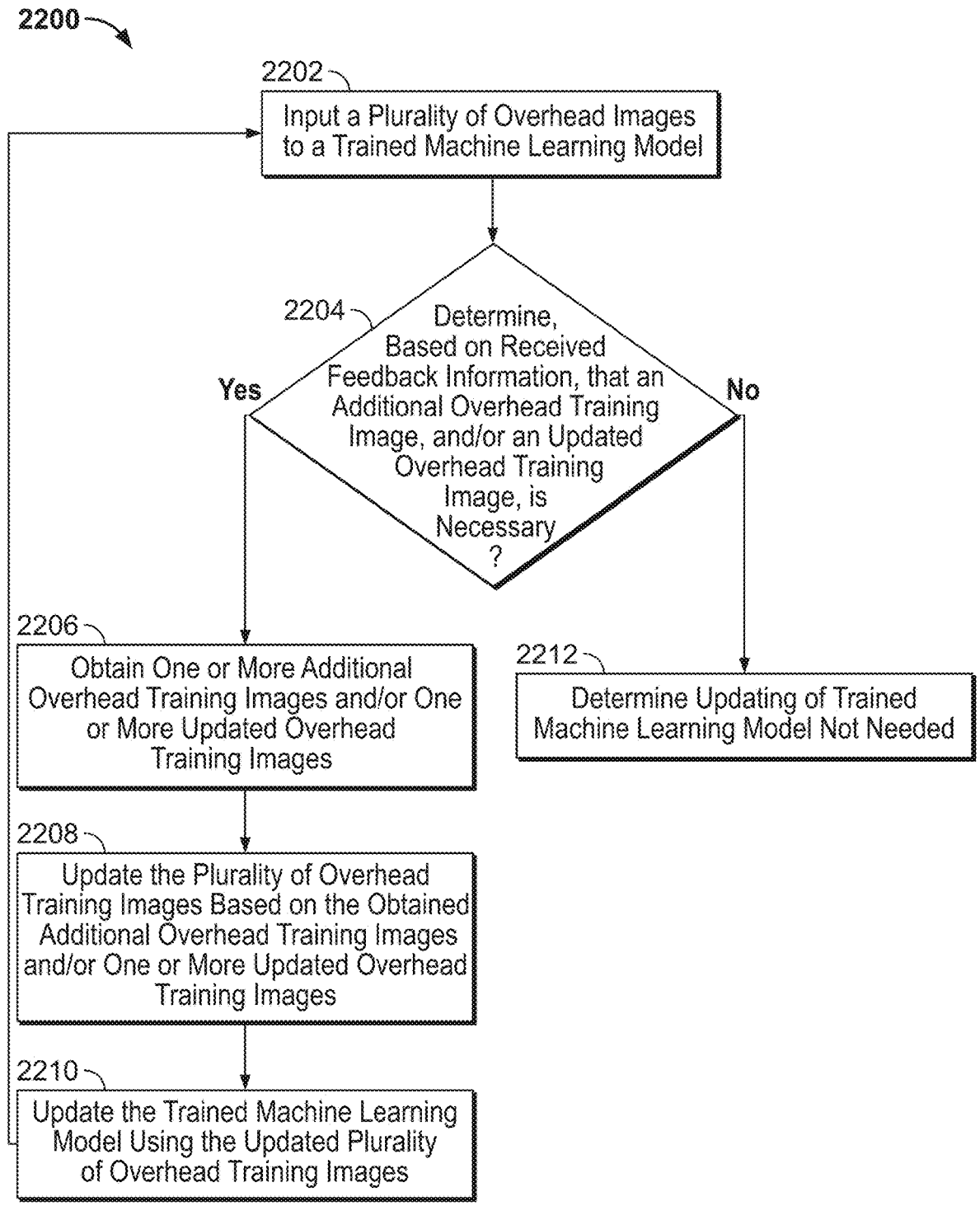
FIG. 22 is a flowchart of a detailed illustrative process for further training a machine learning model, in accordance with some embodiments of this disclosure.

FIG. 22 is a flowchart of a detailed illustrative process 2200 for further training a machine learning model, in accordance with some embodiments of this disclosure. In various embodiments, the individual steps of process 2200 may be implemented by one or more components of the devices and systems discussed in FIGS. 1-16. Although the present disclosure may describe certain steps of process 2200 (and of other processes described herein) as being implemented by certain components of the devices and systems of FIGS. 1-16, this is for purposes of illustration only, and it should be understood that other components of the devices and systems of FIGS. 1-17 may implement those steps instead. In addition, one or more steps of process 2200 may be incorporated into or combined with one or more steps of any other process or embodiment (e.g., FIG. 18 or FIG. 19 or FIG. 20 or FIG. 21, or any other embodiment disclosed herein, or any combination thereof).

At 2202, the mapping system may input a plurality of overhead images to a trained machine learning model (e.g., model 1005 of FIG. 10). 2202 may be performed in a similar manner as 1902 of FIG. 19.

At 2204, the mapping system may determine, based on received feedback information, whether an additional overhead training image, and/or an updated overhead training image, is necessary. For example, each of outputs 1002, 1004, 1006 and 1008 of trained machine learning model 1005 may be respectively associated with a numerical confidence score or a flag indicating a level (e.g., high or low) of confidence for a probability of a mapping category predicted for a particular pixel and indicated by the output. If the confidence information indicates a confidence score that is above a threshold (e.g., predetermined or dynamically set) processing may proceed to 2212. At 2212, the mapping system may determine that the trained machine learning model 1005 need not be updated at this time, based on the confidence score exceeding the threshold. If the confidence information indicates a confidence score that is below the threshold, the mapping system may determine that an additional overhead training image, and/or an updated overhead training image, is necessary, and processing may proceed to 2206.

At 2206, the mapping system may, based on the received feedback information 1010, obtain additional training data (e.g., via aircraft 102) and/or consider editing existing data, e.g., the mapping system may prompt an operator to confirm or update or add mapping category designations to one or more pixels of training overhead images 302 or other data previously input to machine learning model 1005. In some embodiments, the mapping system determine the type of training overhead image image(s) to obtain or update based on the images having been determined to have a low enough confidence. For example, the additional training overhead images or updated training overhead images may correspond to a particular geographical area that machine learning model 1005 may be struggling to categorize pixels of overhead image data of, e.g., based on low confidence scores being output for such overhead image data. In some embodiments, particular equipment, e.g., aircraft 102, may be configured to both implement at least a portion of trained machine learning model 1005 and capture one or more additional overhead training images.

At 2208, the mapping system may be configured to update the plurality of overhead training images 302 based on the obtained additional overhead training images and/or one or more updated overhead training images, obtained at 2206. For example, one or more additional overhead training images may be added to database 303 or database 1001, and/or one or more of the overhead training images stored at database 303 or database 1001 may be updated based on processing performed at 2206. In some embodiments, particular equipment, e.g., aircraft 102, may be configured to perform the processing of 2208.

At 2210, the mapping system may be configured to update trained machine learning model 1005. using the updated plurality of overhead training images. For example, the mapping system may be configured to further train machine learning model 1005 based on the updated plurality of overhead training images comprising the one or more additional overhead training images and/or the updated overhead training images, e.g., the updated plurality of overhead training images, or any suitable portions thereof, may be input to the machine learning model. In some embodiments, particular equipment, e.g., aircraft 102, may be configured to perform the processing of 2210, as part of a closed system, or a cloud-based system, such as comprising the components of system 200 of FIG. 2, may be employed.

The maps generated based on the above-described systems and methods result in many practical benefits. For example, the generated maps over a predefined period (e.g., one year) enables observations of seasonality (e.g., to analyze drought, low water levels, permanent ice and snow, any presence of ice and snow, change in ice and snow over time, rate of ice or snow fall, etc.). For example, a user interface may be provided to an observer, e.g., comprising a temporal axis, that enables the observer to select certain periods of time to analyze or a summary of the entire period of time. As another example, trends regarding specific land uses in different regions may be observed (e.g., deforestation in a particular region, habitat encroachment in a region, road development through time, expansion of agriculture which may be a driver of climate change, analysis of human impact on environment, determining forests cut down in favor of pasture and farming, grasslands being stripped and turned into bare ground such as due to over grazing or dug up to be turned into a mine, estimating health of national parks and state parks, analyzing areas with the least human activity, etc.). In addition, certain organizations (e.g., government entities or private companies) to monitor certain characteristics (e.g, ensuring the presence of required water in a region, maintaining healthy waterways, conservation planning).

In some embodiments, the map may be updated annually to support change detection and highlight planetary land changes, e.g., related to the effects of human activity. A consistent map of land cover for the entire world based on the most current satellite information, may be combined with other data layers for green infrastructure, sustainability projects, and other conservation efforts that benefit from a holistic picture of both the human and natural footprint on the planet. In some embodiments, the land cover model may be available to support on-demand land cover classification, to create maps for project areas frequently (e.g., every week), supporting land managers who monitor change in a specific area of interest, looking at annual change and seasonal differences in land cover. In some embodiments, users may be able to manipulate the map in association with other geographic information system (GIS) layers such as terrain, hydrology, or any other suitable layer, or any combination thereof. Through the visualizations, planners worldwide may better understand the geography around them to make more informed decisions, enabling them to gain insight into locations with distinctive land cover, as well as human activity affecting them. High-resolution, open, accurate, comparable, and timely land cover maps may be critical for decision-makers in many industry sectors and developing nations. These maps improve understanding of important topics such as food security, land use planning, hydrology modeling, and resource management planning. In addition, national government resource agencies use land cover as a basis for understanding trends in natural capital, which helps define land planning priorities and is the basis of budget allocations. Such aspects provide leaders in governments, NGOs, and across industries with a novel, timely view of the planet, and a new AI-powered capability for actionable, science-based insights on demand into the world's landscapes, which may contribute towards the global conservation effort, resource management, and climate change mitigation efforts.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel.

In addition, the systems and methods described herein may be performed in real time. It should also be noted that the systems and/or methods described above may be applied to, or used in accordance with, other systems and/or methods.

What is claimed is:

1. A method of training a machine learning model to categorize each pixel of an input overhead image, comprising:
receiving, by processing circuitry, a plurality of overhead images, each comprising a respective plurality of pixels, wherein each pixel of each overhead image of the plurality of overhead images is designated as being of a particular mapping category of a plurality of mapping categories; and
training, using the processing circuitry, a machine learning model to categorize each pixel of the input overhead image using the plurality of overhead images, wherein the training of the machine learning model comprises using boundary information that indicates where boundary regions between regions of pixels of different categories are located, wherein the boundary regions are distinct regions from the regions of pixels of different categories, and wherein each overhead image of the plurality of overhead images has a resolution of at least 10 meters per pixel.

2. The method of claim 1, wherein, for each pixel of each respective overhead image, the designation of the particular mapping category is appended to the respective overhead image.

3. The method of claim 1, wherein, for each pixel of each respective overhead image, the designation of the particular mapping category is stored at a database.

4. The method of claim 1, wherein each respective overhead image of the plurality of overhead images is annotated to comprise an indication of at least one boundary region of the boundary information.

5. The method of claim 1, wherein training the machine learning model further comprises biasing each of the respective plurality of mapping categories based on a frequency of occurrence of the mapping category in the plurality of overhead images.

6. The method of claim 1, wherein each overhead image of the plurality of overhead images comprises a satellite image or other aerial image that is of a predefined dimensioned area of the planet.

7. The method of claim 1, wherein training the machine learning model further comprises using three-dimensional terrain information to train the machine learning model.

8. The method of claim 1, wherein training the machine learning model further comprises biasing each of the respective plurality of mapping categories based on a particular geographic region corresponding to the respective overhead image.

9. A method of generating a map by predicting to which mapping category of a plurality of mapping categories each pixel of a plurality of overhead images belongs, comprising:
inputting the plurality of overhead images to a trained machine learning model;
determining, using the trained machine learning model, for each pixel of the plurality of overhead images, to which mapping category of the plurality of mapping categories the pixel belongs; and
generating, using processing circuitry, the map of a geographic area associated with the plurality of overhead images based on the plurality of overhead images and on the determined categories,
wherein the machine learning model is trained by:
receiving, by processing circuitry, a plurality of training overhead images, each comprising a respective plurality of pixels, wherein each pixel of each training overhead image of the plurality of training overhead images is designated as being of a particular mapping category of a plurality of mapping categories; and
training, using the processing circuitry, a machine learning model to categorize each pixel of an input overhead image using the plurality of training overhead images, wherein the training of the machine learning model comprises using boundary information that indicates where boundary regions between regions of pixels of different categories are located, wherein the boundary regions are distinct regions from the regions of pixels of different categories, and wherein each training overhead image of the plurality of training overhead images has a resolution of at least 10 meters per pixel.

10. The method of claim 9, wherein:
the plurality of overhead images were captured at a plurality of times during a time period;
generating the map of the geographic area comprises generating the map of the geographic area over the time period; and
the map comprises a temporal axis.

11. The method of claim 9, wherein generating the map comprises generating a composite image based on the plurality of overhead images and on the determined categories.

12. The method of claim 11, wherein:
the plurality of overhead images were captured at a plurality of times during a time period;
the composite image comprises a plurality of pixels each of which respectively corresponds to a pixel included in each of the plurality of overhead images; and
generating the composite image of the geographic area comprises:
identifying, for each pixel of the plurality of overhead images of the geographic area, a particular mapping category that is determined most frequently, or determined to be associated with a highest confidence score, by the trained machine learning model over the time period; and
for each respective pixel of the composite image, causing the pixel to be represented as being of the same particular mapping category that is identified for the pixel of the plurality of overhead images that corresponds to the pixel of the composite image.

13. The method of claim 9, wherein generating the map comprises formulating a class weighted mode parameter based on:
a probability associated with each mapping category; and
a desired weight of a particular mapping category of the plurality of mapping categories with respect to the other mapping categories of the plurality of mapping categories.

14. The method of claim 13, wherein:
the plurality of mapping categories comprise at least grass, flooded vegetation, crops, bare ground, snow/ice and clouds; and
formulating the class weighted mode comprises assigning higher weights to each of the grass and flooded vegetation categories as compared to the crops, bare ground, snow/ice, and clouds categories.

15. The method of claim 9, wherein generating the map comprises generating the map at a resolution of at least 10 meters per pixel.

16. The method of claim 9, wherein generating the map comprises:
    generating a plurality of maps of a plurality of geographic areas associated with the plurality of overhead images based on the plurality of overhead images and on the determined categories; and
    compositing the plurality of maps together to generate a composite map comprising each of the plurality of geographic areas.

17. The method of claim 16, wherein the composite map comprises a global map.

18. The method of claim 13, wherein formulating the class weighted mode parameter based on a desired weight of a particular mapping category of the plurality of mapping categories with respect to the other mapping categories of the plurality of mapping categories comprises assigning a first set of weights for the plurality of mapping categories to a particular geographic region as compared to other geographic regions.

19. The method of claim 9, further comprising:
    receiving feedback information from the trained machine learning model;
    determining, based on the feedback information, that an additional training overhead image is necessary;
    obtaining one or more additional training overhead images;
    updating the plurality of training overhead images with the one or more additional training overhead images; and
    updating the trained machine learning model using the updated plurality of training overhead images.

20. The method of claim 9, further comprising:
    receiving feedback information from the trained machine learning model;
    determining, based on the feedback information, that one or more mapping category designations for respective pixels of at least one of the plurality of training overhead images need to be updated;
    updating the plurality of training overhead images by updating the one or more mapping category designations for the respective pixels of the at least one of the plurality of training overhead images; and
    updating the trained machine learning model using the updated plurality of training overhead images.

21. The method of claim 19, wherein:
    the trained machine learning model is implemented at particular equipment;
    the particular equipment comprises the processing circuitry that is configured to receive the feedback information from the trained machine learning model;
    the particular equipment comprises one or more sensors configured to capture the additional training overhead image; and
    the processing circuitry of the particular equipment is configured to perform the updating of the plurality of training overhead images with the additional training overhead image and the updating of the trained machine learning model using the updated plurality of training overhead images.

22. The method of claim 9, wherein the plurality of overhead images are captured by one or more imagery sources corresponding to at least one of a visible or infrared optical imagery source, a synthetic aperture radar imagery source, or a medium wave or long wave thermal infrared imagery source.

23. The method of claim 22, wherein generating the map comprises generating the map at a resolution based on upsampling or down sampling an intrinsic resolution of the one or more imagery sources.

24. A system for training a machine learning model to categorize each pixel of an input overhead image, comprising:
    processing circuitry configured to:
        receive a plurality of overhead images, each comprising a respective plurality of pixels, wherein each pixel of each overhead image of the plurality of overhead images is designated as being of a particular mapping category of a plurality of mapping categories; and
        train a machine learning model to categorize each pixel of the input overhead image using the plurality of overhead images, wherein the processing circuitry is configured to train the machine learning model by using boundary information that indicates where boundary regions between regions of pixels of different categories are located, wherein the boundary regions are distinct regions from the regions of pixels of different categories, and wherein each overhead image of the plurality of overhead images has a resolution of at least 10 meters per pixel.

25. The system of claim 24, wherein, for each pixel of each respective overhead image, the designation of the particular mapping category is appended to the respective overhead image.

26. The system of claim 24, wherein, for each pixel of each respective overhead image, the designation of the particular mapping category is stored at a database.

27. The system of claim 24, wherein each respective overhead image of the plurality of overhead images is annotated to comprise an indication of at least one boundary region of the boundary information.

28. The system of claim 24, wherein the processing circuitry is configured to train the machine learning model by biasing each of the respective plurality of mapping categories based on a frequency of occurrence of the mapping category in the plurality of overhead images.

29. The system of claim 24, wherein each overhead image of the plurality of overhead images comprises a satellite image or other aerial image that is of a predefined dimensioned area of the planet.

30. The system of claim 24, wherein the processing circuitry is configured to train the machine learning model by using three-dimensional terrain information to train the machine learning model.

31. The system of claim 24, wherein the processing circuitry is configured to train the machine learning model by biasing each of the respective plurality of mapping categories based on a particular geographic region corresponding to the respective overhead image.

32. A system of generating a map by predicting to which mapping category of a plurality of mapping categories each pixel of a plurality of overhead images belongs, comprising:
    processing circuitry configured to:
        input the plurality of overhead images to a trained machine learning model;
        determine, using the trained machine learning model, for each pixel of the plurality of overhead images, to which mapping category of the plurality of mapping categories the pixel belongs; and
        generate the map of a geographic area associated with the plurality of overhead images based on the plurality of overhead images and on the determined categories, wherein the machine learning model is trained by:
receiving, by the processing circuitry, a plurality of training overhead images, each comprising a respective plurality of pixels, wherein each pixel of each training overhead image of the plurality of training overhead images is designated as being of a particular mapping category of a plurality of mapping categories; and
training, using the processing circuitry, a machine learning model to categorize each pixel of an input overhead image using the plurality of training overhead images, wherein the training of the machine learning model comprises using boundary information that indicates where boundary regions between regions of pixels of different categories are located, wherein the boundary regions are distinct regions from the regions of pixels of different categories, and wherein each overhead image of the plurality of overhead images has a resolution of at least 10 meters per pixel.

33. The system of claim 32, wherein:
the plurality of overhead images were captured at a plurality of times during a time period;
the processing circuitry is configured to generate the map of the geographic area by generating the map of the geographic area over the time period; and
the map comprises a temporal axis.

34. The system of claim 32, wherein the processing circuitry is configured to generate the map by generating a composite image based on the plurality of overhead images and on the determined categories.

35. The system of claim 34, wherein:
the plurality of overhead images were captured at a plurality of times during a time period;
the composite image comprises a plurality of pixels each of which respectively corresponds to a pixel included in each of the plurality of overhead images; and
the processing circuitry is configured to generate the composite image of the geographic area by:
identifying, for each pixel of the plurality of overhead images of the geographic area, a particular mapping category that is determined most frequently, or determined to be associated with a highest confidence score, by the trained machine learning model over the time period; and
for each respective pixel of the composite image, causing the pixel to be represented as being of the same particular mapping category that is identified for the pixel of the plurality of overhead images that corresponds to the pixel of the composite image.

36. The system of claim 32, wherein the processing circuitry is configured to generate the map by formulating a class weighted mode parameter based on:
a probability associated with each mapping category; and
a desired weight of a particular mapping category of the plurality of mapping categories with respect to the other mapping categories of the plurality of mapping categories.

37. The system of claim 36, wherein:
the plurality of mapping categories comprise at least grass, flooded vegetation, crops, bare ground, snow/ice and clouds; and
the processing circuitry is configured to formulate the class weighted mode by assigning higher weights to each of the grass and flooded vegetation categories as compared to the crops, bare ground, snow/ice, and clouds categories.

38. The system of claim 32, wherein the processing circuitry is configured to generate the map by generating the map at a resolution of at least 10 meters per pixel.

39. The system of claim 32, wherein the processing circuitry is configured to generate the map by:
generating a plurality of maps of a plurality of geographic areas associated with the plurality of overhead images based on the plurality of overhead images and on the determined categories; and
compositing the plurality of maps together to generate a composite map comprising each of the plurality of geographic areas.

40. The system of claim 39, wherein the composite map comprises a global map.

41. The system of claim 36, wherein the processing circuitry is configured to formulate the class weighted mode parameter based on a desired weight of a particular mapping category of the plurality of mapping categories with respect to the other mapping categories of the plurality of mapping categories by assigning a first set of weights for the plurality of mapping categories to a particular geographic region as compared to other geographic regions.

42. The system of claim 32, wherein the processing circuitry is further configured to:
receive feedback information from the trained machine learning model;
determine, based on the feedback information, that an additional training overhead image is necessary;
obtain one or more additional training overhead images;
update the plurality of training overhead images with the one or more additional training overhead images; and
update the trained machine learning model using the updated plurality of training overhead images.

43. The system of claim 32, wherein the processing circuitry is further configured to:
receive feedback information from the trained machine learning model;
determine, based on the feedback information, that one or more mapping category designations for respective pixels of at least one of the plurality of training overhead images need to be updated;
update the plurality of training overhead images by updating the one or more mapping category designations for the respective pixels of the at least one of the plurality of training overhead images; and
update the trained machine learning model using the updated plurality of training overhead images.

44. The system of claim 42, wherein:
the trained machine learning model is implemented at particular equipment;
the particular equipment comprises the processing circuitry that is configured to receive the feedback information from the trained machine learning model;
the particular equipment comprises one or more sensors configured to capture the additional training overhead image; and
the processing circuitry of the particular equipment is configured to perform the updating of the plurality of training overhead images with the additional training overhead image and the updating of the trained machine learning model using the updated plurality of training overhead images.

45. The system of claim 32, wherein the plurality of overhead images are captured by one or more imagery sources corresponding to at least one of a visible or infrared optical imagery source, a synthetic aperture radar imagery source, or a medium wave or long wave thermal infrared imagery source.

46. The system of claim 45, wherein generating the map comprises generating the map at a resolution based on upsampling or down sampling an intrinsic resolution of the one or more imagery sources.

47. A non-transitory computer-readable medium having non-transitory computer-readable instructions encoded thereon that, when executed by a processor, cause the processor to:
receive a plurality of overhead images, each comprising a respective plurality of pixels, wherein each pixel of each overhead image of the plurality of overhead images is designated as being of a particular mapping category of a plurality of mapping categories; and
train a machine learning model to categorize each pixel of the input overhead image using the plurality of overhead images, wherein execution of the instructions causes the processor to train the machine learning model comprises using boundary information that indicates where boundary regions between regions of pixels of different categories are located, wherein the boundary regions are distinct regions from the regions of pixels of different categories, and wherein each overhead image of the plurality of overhead images has a resolution of at least 10 meters per pixel.

48. The non-transitory computer-readable medium of claim 47, wherein, for each pixel of each respective overhead image, the designation of the particular mapping category is appended to the respective overhead image.

49. The non-transitory computer-readable medium of claim 47, wherein, for each pixel of each respective overhead image, the designation of the particular mapping category is stored at a database.

50. The non-transitory computer-readable medium of claim 47, wherein each respective overhead image of the plurality of overhead images is annotated to comprise an indication of at least one boundary region of the boundary information.

51. The non-transitory computer-readable medium of claim 47, wherein execution of the instructions causes the processor to train the machine learning model by biasing each of the respective plurality of mapping categories based on a frequency of occurrence of the mapping category in the plurality of overhead images.

52. The non-transitory computer-readable medium of claim 47, wherein each overhead image of the plurality of overhead images comprises a satellite image or other aerial image that is of a predefined dimensioned area of the planet.

53. The non-transitory computer-readable medium of claim 47, wherein execution of the instructions causes the processor to train the machine learning model by using three-dimensional terrain information to train the machine learning model.

54. The non-transitory computer-readable medium of claim 47, wherein execution of the instructions causes the processor to train the machine learning model by biasing each of the respective plurality of mapping categories based on a particular geographic region corresponding to the respective overhead image.

55. A non-transitory computer-readable medium having non-transitory computer-readable instructions encoded thereon that, when executed by a processor, cause the processor to:
input a plurality of overhead images to a trained machine learning model;
determine, using the trained machine learning model, for each pixel of the plurality of overhead images, to which mapping category of a plurality of mapping categories the pixel belongs; and
generate, using processing circuitry, a map of a geographic area associated with the plurality of overhead images based on the plurality of overhead images and on the determined categories,
wherein the machine learning model is trained by executing instructions to cause the processor to:
receive a plurality of training overhead images, each comprising a respective plurality of pixels, wherein each pixel of each training overhead image of the plurality of training overhead images is designated as being of a particular mapping category of a plurality of mapping categories; and
train a machine learning model to categorize each pixel of an input overhead image using the plurality of training overhead images, wherein the training of the machine learning model comprises using boundary information that indicates where boundary regions between regions of pixels of different categories are located, wherein the boundary regions are distinct regions from the regions of pixels of different categories, and wherein each overhead image of the plurality of overhead images has a resolution of at least 10 meters per pixel.

56. The non-transitory computer-readable medium of claim 55, wherein:
the plurality of overhead images were captured at a plurality of times during a time period;
execution of the instructions causes the processor to generate the map of the geographic area by generating the map of the geographic area over the time period; and
the map comprises a temporal axis.

57. The non-transitory computer-readable medium of claim 55, wherein execution of the instructions causes the processor to generate the map by generating a composite image based on the plurality of overhead images and on the determined categories.

58. The non-transitory computer-readable medium of claim 57, wherein:
the plurality of overhead images were captured at a plurality of times during a time period;
the composite image comprises a plurality of pixels each of which respectively corresponds to a pixel included in each of the plurality of overhead images; and
execution of the instructions causes the processor to generate the map of the geographic area by:
identifying, for each pixel of the plurality of overhead images of the geographic area, a particular mapping category that is determined most frequently, or determined to be associated with a highest confidence score, by the trained machine learning model over the time period; and
for each respective pixel of the composite image, causing the pixel to be represented as being of the same particular mapping category that is identified for the pixel of the plurality of overhead images that corresponds to the pixel of the composite image.

59. The non-transitory computer-readable medium of claim 55, wherein execution of the instructions causes the processor to generate the map by formulating a class weighted mode parameter based on:

a probability associated with each mapping category; and
a desired weight of a particular mapping category of the plurality of mapping categories with respect to the other mapping categories of the plurality of mapping categories.

60. The non-transitory computer-readable medium of claim 59, wherein:
the plurality of mapping categories comprise at least grass, flooded vegetation, crops, bare ground, snow/ice and clouds; and
execution of the instructions causes the processor to formulate the class weighted mode by assigning higher weights to each of the grass and flooded vegetation categories as compared to the crops, bare ground, snow/ice, and clouds categories.

61. The non-transitory computer-readable medium of claim 55, wherein execution of the instructions causes the processor to generate the map at a resolution of at least 10 meters per pixel.

62. The non-transitory computer-readable medium of claim 55, wherein execution of the instructions causes the processor to generate the map by:
generating a plurality of maps of a plurality of geographic areas associated with the plurality of overhead images based on the plurality of overhead images and on the determined categories; and
compositing the plurality of maps together to generate a composite map comprising each of the plurality of geographic areas.

63. The non-transitory computer-readable medium of claim 62, wherein the composite map comprises a global map.

64. The non-transitory computer-readable medium of claim 59, wherein execution of the instructions causes the processor to formulate the class weighted mode parameter based on a desired weight of a particular mapping category of the plurality of mapping categories with respect to the other mapping categories of the plurality of mapping categories by assigning a first set of weights for the plurality of mapping categories to a particular geographic region as compared to other geographic regions.

65. The non-transitory computer-readable medium of claim 55, wherein execution of the instructions causes the processor to:
receive feedback information from the trained machine learning model;
determine, based on the feedback information, that an additional training overhead image is necessary;
obtain one or more additional training overhead images;
update the plurality of training overhead images with the one or more additional training overhead images; and
update the trained machine learning model using the updated plurality of training overhead images.

66. The non-transitory computer-readable medium of claim 55, wherein execution of the instructions causes the processor to:
receive feedback information from the trained machine learning model;
determine, based on the feedback information, that one or more mapping category designations for respective pixels of at least one of the plurality of training overhead images need to be updated;
update the plurality of training overhead images by updating the one or more mapping category designations for the respective pixels of the at least one of the plurality of training overhead images; and
update the trained machine learning model using the updated plurality of training overhead images.

67. The non-transitory computer-readable medium of claim 65, wherein:
the trained machine learning model is implemented at particular equipment;
the particular equipment comprises the processor that is configured to receive the feedback information from the trained machine learning model;
the particular equipment comprises one or more sensors configured to capture the additional training overhead image; and
the processor of the particular equipment is configured to perform the updating of the plurality of training overhead images with the additional training overhead image and the updating of the trained machine learning model using the updated plurality of training overhead images.

68. The non-transitory computer-readable medium of claim 55, wherein the plurality of overhead images are captured by one or more imagery sources corresponding to at least one of a visible or infrared optical imagery source, a synthetic aperture radar imagery source, or a medium wave or long wave thermal infrared imagery source.

69. The non-transitory computer-readable medium of claim 68, wherein execution of the instructions causes the processor to generate the map at a resolution based on upsampling or down sampling an intrinsic resolution of the one or more imagery sources.

70. The method of claim 9, wherein:
generating the map comprises generating a composite image based on the plurality of overhead images and on the determined categories;
the plurality of overhead images were captured at a plurality of times during a time period;
the composite image comprises a plurality of pixels each of which respectively corresponds to a pixel included in each of the plurality of overhead images; and
generating the composite image of the geographic area comprises:
identifying, for each pixel of the plurality of overhead images of the geographic area, a particular mapping category that is determined most frequently by the trained machine learning model over the time period; and
for each respective pixel of the composite image, causing the pixel to be represented as being of the same particular mapping category that is identified for the pixel of the plurality of overhead images that corresponds to the pixel of the composite image.

71. The system of claim 32, wherein:
the processing circuitry is configured to generate the map by generating a composite image based on the plurality of overhead images and on the determined categories;
the plurality of overhead images were captured at a plurality of times during a time period;
the composite image comprises a plurality of pixels each of which respectively corresponds to a pixel included in each of the plurality of overhead images; and
the processing circuitry is configured to generate the composite image of the geographic area by:
identifying, for each pixel of the plurality of overhead images of the geographic area, a particular mapping category that is determined most frequently by the trained machine learning model over the time period; and for each respective pixel of the composite image, causing the pixel to be represented as being of the same particular mapping category that is identified for the pixel of the plurality of overhead images that corresponds to the pixel of the composite image.

72. The non-transitory computer-readable medium of claim 55, wherein:

execution of the instructions causes the processor to generate the map by generating a composite image based on the plurality of overhead images and on the determined categories;

the plurality of overhead images were captured at a plurality of times during a time period;

the composite image comprises a plurality of pixels each of which respectively corresponds to a pixel included in each of the plurality of overhead images; and execution of the instructions causes the processor to generate the map of the geographic area by:

identifying, for each pixel of the plurality of overhead images of the geographic area, a particular mapping category that is determined most frequently by the trained machine learning model over the time period; and for each respective pixel of the composite image, causing the pixel to be represented as being of the same particular mapping category that is identified for the pixel of the plurality of overhead images that corresponds to the pixel of the composite image.

* * * * *